United States Patent
Nakajima

(10) Patent No.: US 10,694,060 B2
(45) Date of Patent: Jun. 23, 2020

(54) IMAGE FORMING SYSTEM, IMAGE FORMING APPARATUS, AND IMAGE FORMING METHOD

(71) Applicant: CANON KABUSHIKI KAISHA, Tokyo (JP)

(72) Inventor: Satoru Nakajima, Moriya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/148,753

(22) Filed: Oct. 1, 2018

(65) Prior Publication Data
US 2019/0109958 A1    Apr. 11, 2019

(30) Foreign Application Priority Data
Oct. 6, 2017   (JP) .................. 2017-196455

(51) Int. Cl.
*H04N 1/00*    (2006.01)

(52) U.S. Cl.
CPC ..... *H04N 1/00875* (2013.01); *H04N 1/00204* (2013.01)

(58) Field of Classification Search
CPC combination set(s) only.
See application file for complete search history.

(56) References Cited

U.S. PATENT DOCUMENTS

| 2010/0321717 A1* | 12/2010 | Ohba | G06F 21/608 |
|---|---|---|---|
| | | | 358/1.14 |
| 2014/0012749 A1* | 1/2014 | Lee | G06Q 20/367 |
| | | | 705/40 |
| 2017/0090832 A1* | 3/2017 | Ishibashi | G06F 3/1222 |

FOREIGN PATENT DOCUMENTS

JP    2013-240929 A    12/2013

* cited by examiner

*Primary Examiner* — Helen Zong
(74) *Attorney, Agent, or Firm* — Canon U.S.A., Inc., IP Division

(57) ABSTRACT

An image forming apparatus that executes a password-protected job includes a function for omitting an input of a job password, manages a user password for keyboard authentication in association with a user, manages a personal identification number for icon authentication in association with the user, accepts login to an account of the user based on the keyboard authentication, permits execution of a password-protected print job associated with the user based on a print instruction without inputting a job password, accepts login to the account of the user based on the icon authentication, and permits execution of a password-protected print job associated with the user based on a print instruction with an input of a job password.

10 Claims, 17 Drawing Sheets

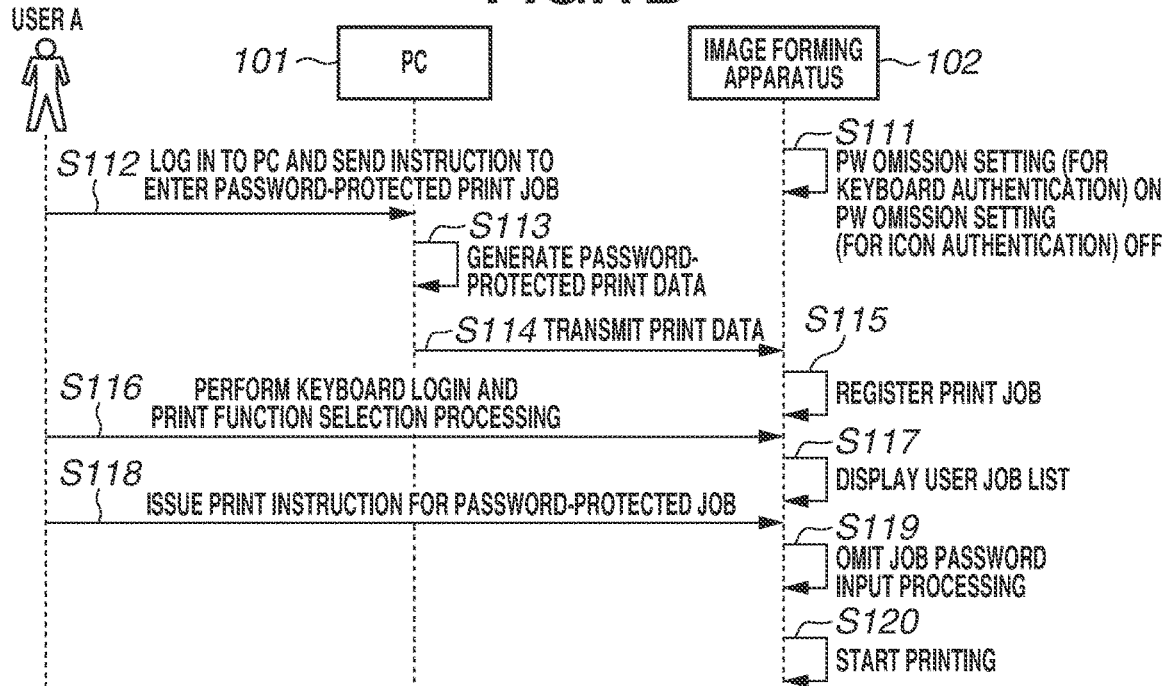
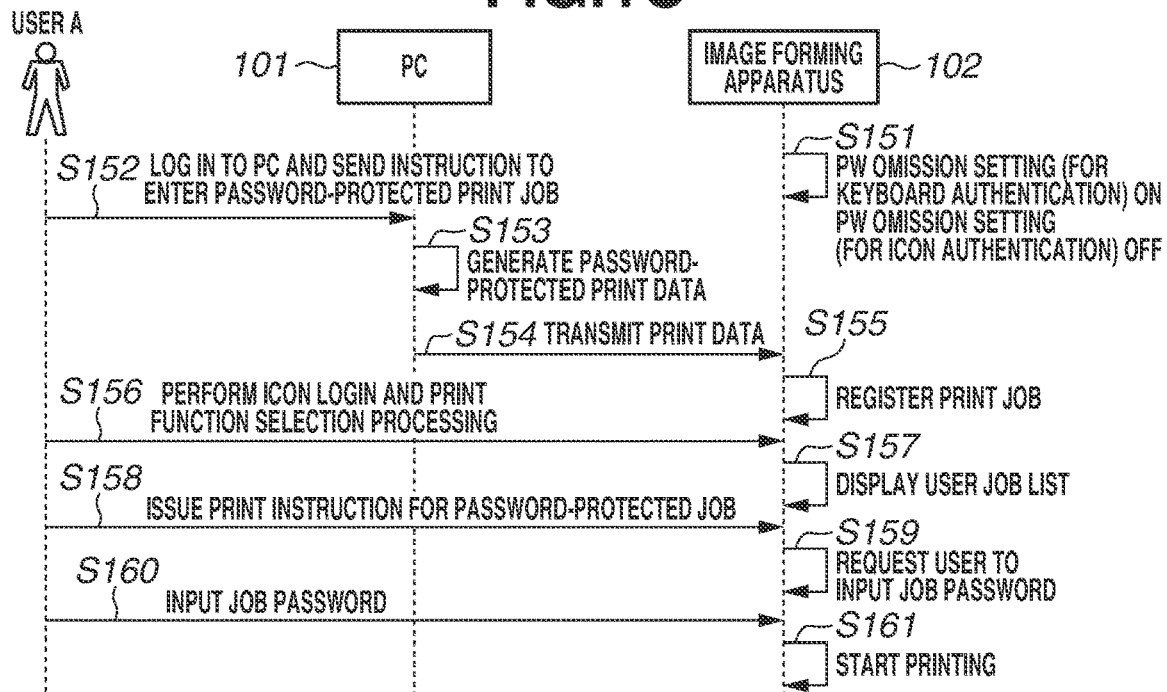

FIG.4A
410 PRINT DATA

| [HEADER PORTION]<br>USER: UserA<br>PASSWORD: 9999<br>PRINT JOB NAME: AAA.txt<br>PRINT SETTING:<br>　ONE COPY OF ONE-SIDED<br>　BLACK-AND-WHITE PRINT | 411 |
| --- | --- |
| [PDL COMMAND PORTION] | 412 |

FIG.4C
430 USER MANAGEMENT TABLE

| 431 | 432 | 433 | 434 |
| --- | --- | --- | --- |
| USER NAME | USER PASSWORD | PERSONAL IDENTIFICATION NUMBER | ROLE |
| UserA | abcd1111 | 1234 | General |
| UserB | wxyz2222 | 5678 | General |
| ... | ... | ... | ... |

FIG.4B
420 USER A BIBLIOGRAPHIC INFORMATION TABLE

| 422 | 423 | 424 | 425 | 426 | 427 |
| --- | --- | --- | --- | --- | --- |
| DATE/ TIME | IP ADDRESS | STORAGE LOCATION | PRINT JOB NAME | PRINT SETTING | JOB PASSWORD |
| 2016/4/10 10:34:45 | 192.168.2.11 | /data/0015/xxx | AAA.txt | ONE COPY OF ONE-SIDED BLACK-AND-WHITE PRINT | 9999 |
| 2016/4/20 13:50:22 | 192.168.2.11 | /data/0591/yyy | BBB.pdf | THREE COPIES OF DOUBLE-SIDED COLOR PRINT | |
| 2016/5/28 14:10:00 | 192.168.2.11 | /data/8125/zzz | CCC.doc | FIVE COPIES OF DOUBLE-SIDED 2-in-1 COLOR PRINT | |
| ... | ... | ... | ... | ... | ... |

FIG.4D
440 MAIN BODY SETTING TABLE

| | 441 | 442 | 443 | 444 | 445 |
| --- | --- | --- | --- | --- | --- |
| | KEYBOARD AUTHENTICATION | ICON AUTHENTICATION | PERSONAL IDENTIFICATION NUMBER REQUIRED | PW OMISSION (KEYBOARD) | PW OMISSION (ICON) |
| MODE 1 | ON | ON | ON | ON | ON |
| MODE 2 | ON | ON | ON | ON | OFF |
| MODE 3 | ON | ON | ON | OFF | ON |
| MODE 4 | ON | ON | ON | OFF | OFF |
| MODE 5 | OFF | OFF | — | — | — |

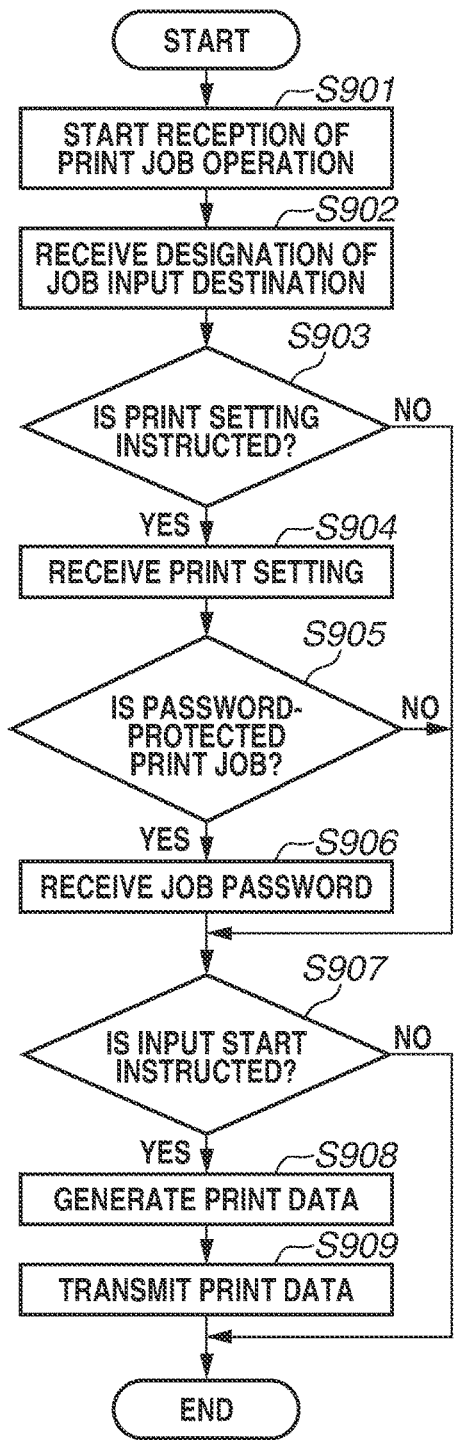
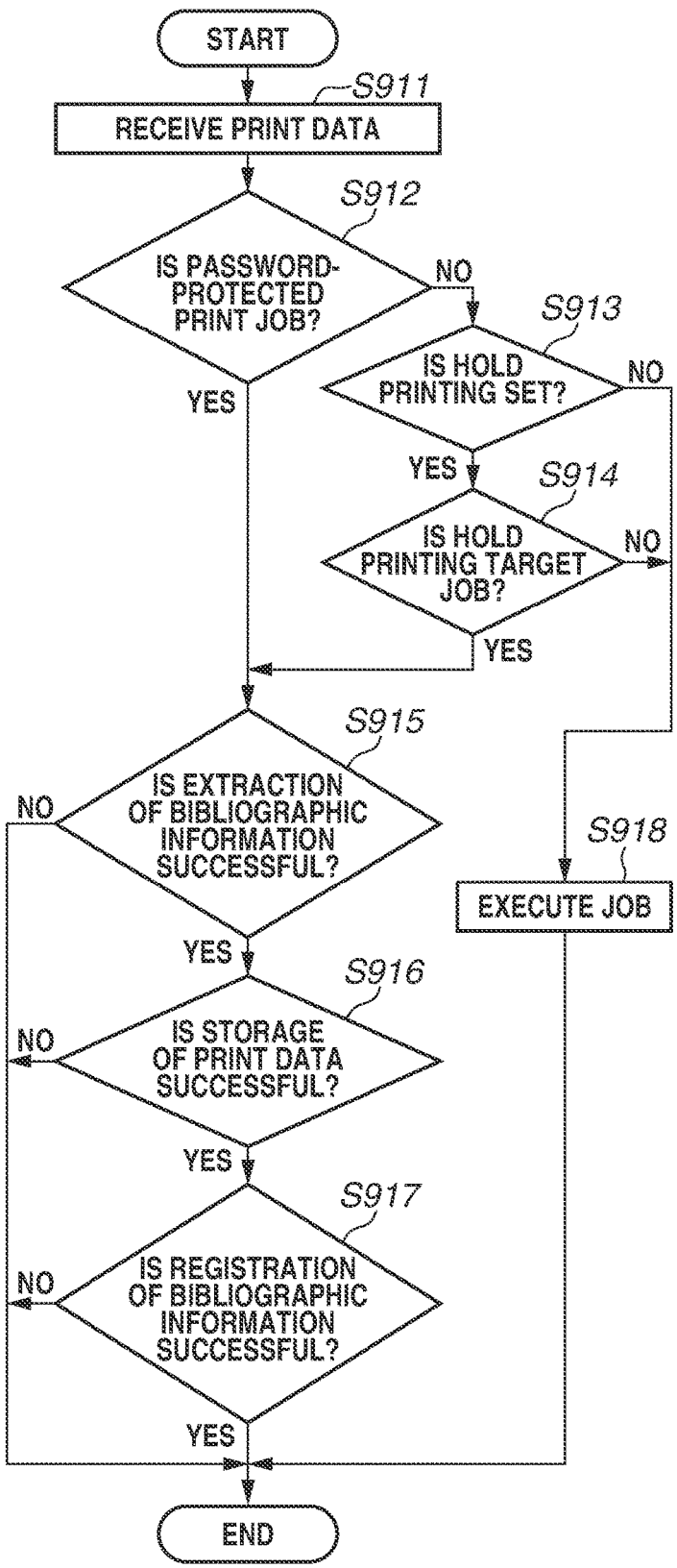

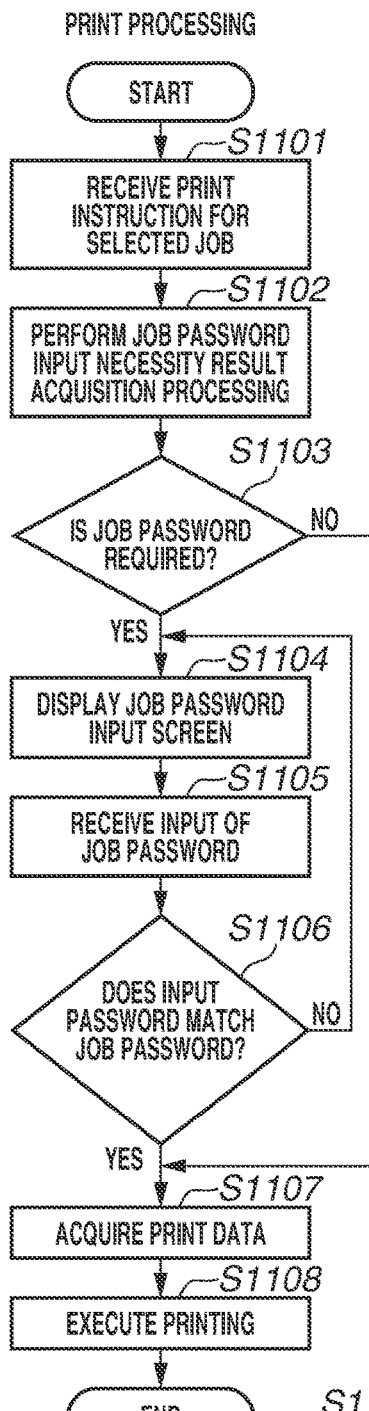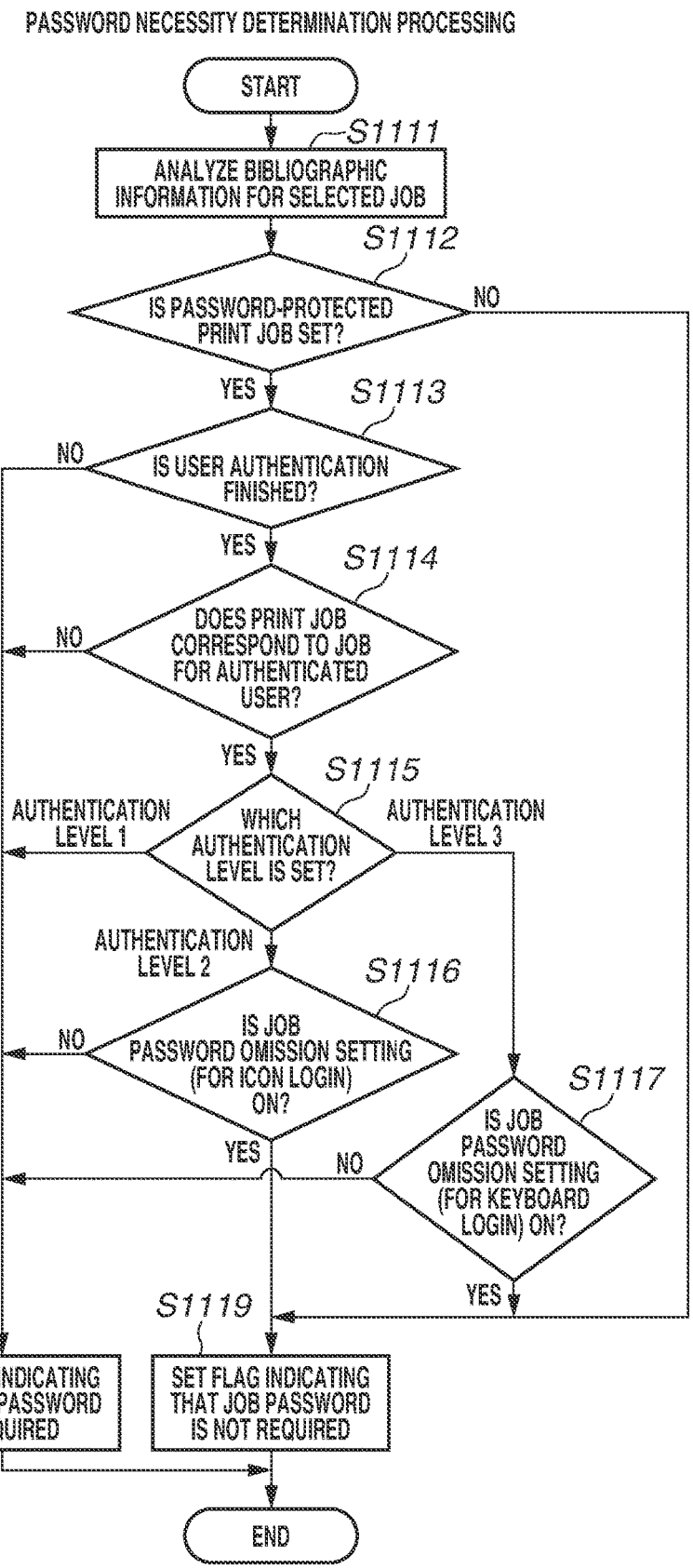
FIG.11A PRINT PROCESSING
FIG.11B PASSWORD NECESSITY DETERMINATION PROCESSING

| USER AUTHENTICATION | | SECURITY LEVEL | USER'S JOB/ OTHER'S JOB | JOB PASSWORD OMISSION |
|---|---|---|---|---|
| KEYBOARD LOGIN | | LEVEL 3 (AUTHENTICATION STATE) | USER'S JOB | ALLOWED |
| | | | OTHER'S JOB | NOT ALLOWED |
| ICON SELECTION LOGIN | "MAKE SURE TO USE PERSONAL IDENTIFICATION NUMBER" SETTING IS ON | LEVEL 2 (QUASI-AUTHENTICATION STATE) | USER'S JOB | ALLOWED |
| | | | OTHER'S JOB | NOT ALLOWED |
| | "MAKE SURE TO USE PERSONAL IDENTIFICATION NUMBER" SETTING IS OFF | LEVEL 1 (IDENTIFICATION STATE) | USER'S JOB | NOT ALLOWED |
| | | | OTHER'S JOB | NOT ALLOWED |
| AUTHENTICATION OFF/ GUEST LOGIN | | LEVEL 0 (NON-IDENTIFICATION STATE) | — | NOT ALLOWED |

| USER AUTHENTICATION | | PRESENCE/ABSENCE OF SETTING OF PERSONAL IDENTIFICATION NUMBER | SECURITY LEVEL | USER'S JOB/ OTHER'S JOB | JOB PASSWORD OMISSION |
|---|---|---|---|---|---|
| KEYBOARD LOGIN | | — | LEVEL 3 (AUTHENTICATION STATE) | USER'S JOB | ALLOWED |
| | | | | OTHER'S JOB | NOT ALLOWED |
| ICON SELECTION LOGIN | "MAKE SURE TO USE PERSONAL IDENTIFICATION NUMBER" SETTING IS ON | PRESENT | LEVEL 2 (QUASI-AUTHENTICATION STATE) | USER'S JOB | ALLOWED |
| | | | | OTHER'S JOB | NOT ALLOWED |
| | "MAKE SURE TO USE PERSONAL IDENTIFICATION NUMBER" SETTING IS OFF | PRESENT | | USER'S JOB | ALLOWED |
| | | | | OTHER'S JOB | NOT ALLOWED |
| | | ABSENT | LEVEL 1 (IDENTIFICATION STATE) | USER'S JOB | NOT ALLOWED |
| | | | | OTHER'S JOB | NOT ALLOWED |
| AUTHENTICATION OFF/ GUEST LOGIN | | — | LEVEL 0 (NON-IDENTIFICATION STATE) | — | NOT ALLOWED |

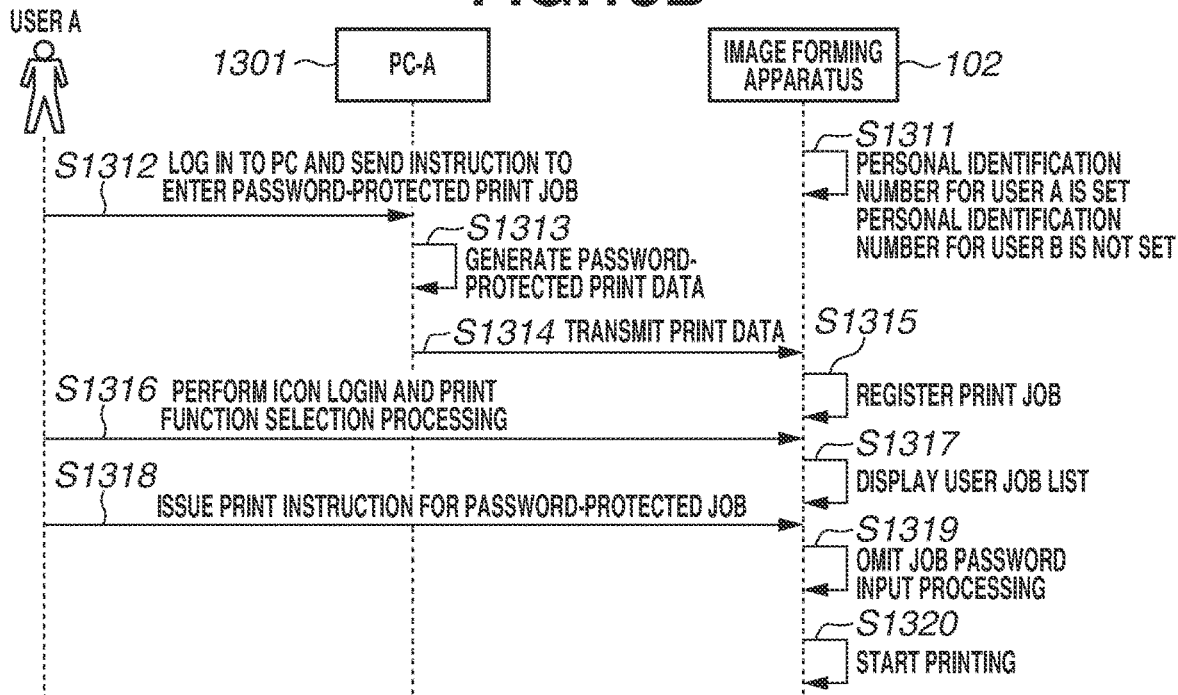
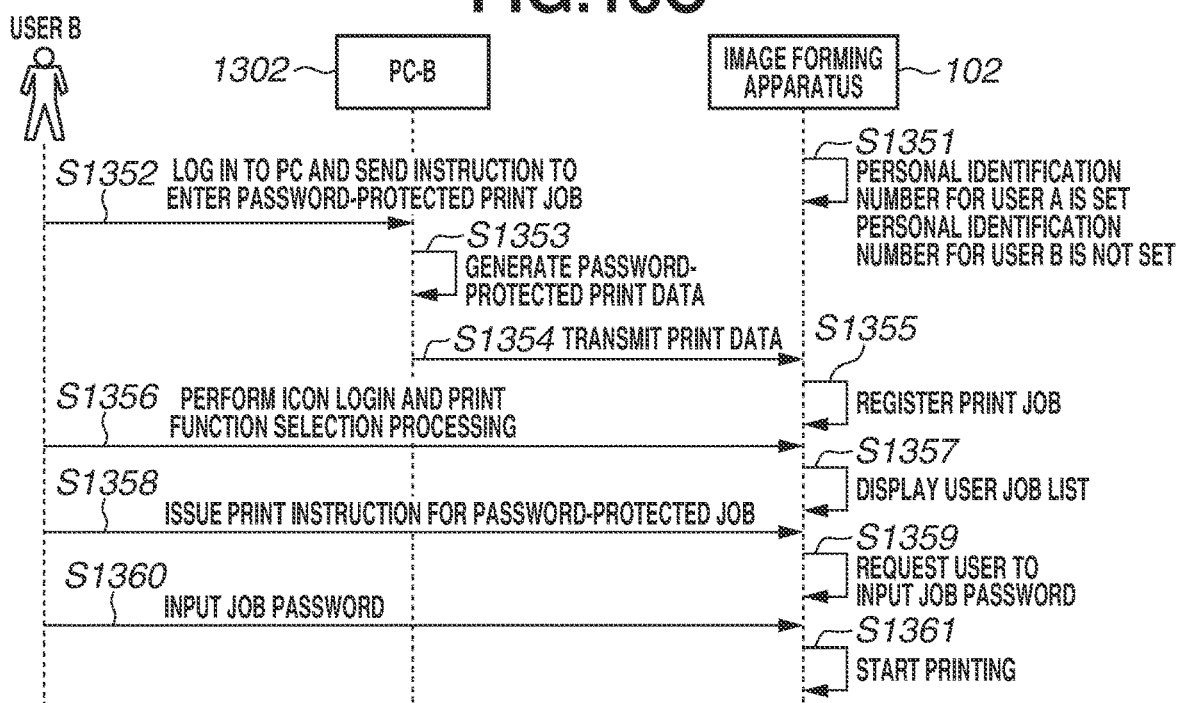

FIG.14A

*430* USER MANAGEMENT TABLE

| USER NAME | USER PASSWORD | PERSONAL IDENTIFICATION NUMBER | ROLE |
|---|---|---|---|
| UserA | abcd1111 | 1234 | General |
| UserB | wxyz2222 | — | General |
| ... | ... | ... | ... |

FIG.14B

*440* MAIN BODY SETTING TABLE

| | KEYBOARD AUTHENTICATION | ICON AUTHENTICATION | PERSONAL IDENTIFICATION NUMBER REQUIRED | PW OMISSION (KEYBOARD) | PW OMISSION (ICON) |
|---|---|---|---|---|---|
| | ... | ... | ... | ... | ... |
| MODE 6 | ON | ON | OFF | ON | ON |
| MODE 7 | ON | ON | OFF | ON | OFF |
| MODE 8 | ON | ON | OFF | OFF | ON |
| MODE 9 | ON | ON | OFF | OFF | OFF |

FIG.17

1730 USER MANAGEMENT TABLE

| USER NAME *431* | USER PASSWORD *432* | PERSONAL IDENTIFICATION NUMBER *433* | ROLE *434* | PW OMISSION (KEYBOARD) *1735* | PW OMISSION (ICON) *1736* |
|---|---|---|---|---|---|
| UserA | abcd1111 | 1234 | General | ON | ON |
| UserB | wxyz2222 | 5678 | General | ON | OFF |
| ... | | | | | ... |

IMAGE FORMING SYSTEM, IMAGE FORMING APPARATUS, AND IMAGE FORMING METHOD

BACKGROUND

Field

The present disclosure relates to an image forming apparatus that forms an image on a sheet. The image forming apparatus is used as a facsimile (FAX) machine, a copying machine, a printer, and the like.

Description of the Related Art

An image forming apparatus, such as a printer, has been known as an apparatus for forming an image (printing) on a sheet. One function of the image forming apparatus is a hold printing function in which print data is stored in advance and printing is started in response to a print instruction from a user is known (Japanese Patent Application Laid-Open No. 2013-240929). The image thrilling apparatus discussed in Japanese Patent Application Laid-Open No. 2013-240929 includes a user authentication function in which the input of a job password for a job password-protected print job for an authenticated user can be omitted.

In the image forming apparatus discussed in Japanese Patent Application Laid-Open No. 2013-240929, only a simple classification, such as an authenticated or unauthenticated state, is used for a user authentication state. However, recently, the office environment in which image forming apparatuses are located has been complicated. In addition, it is common to set a plurality of user authentication levels. Accordingly, it is preferable for each image forming apparatus to be able to deal with a plurality of levels of authentication states. Allowing the omission of a job password in an authentication state with a low authentication level leads to a deterioration in security. Therefore, it is preferable to appropriately make a job password omission setting depending on the authentication level.

SUMMARY

In view of the above, the present disclosure is directed to an image forming apparatus that makes a job password omission setting depending on a plurality of authentication methods.

According to an aspect of the present disclosure, an image forming apparatus that executes a password-protected job to permit execution of printing based on an input of a job password and is configured to permit the execution of the password-protected job based on a specific condition without inputting a job password includes at least one memory that stores a set of instructions, and at least one processor that executes the instructions to manage a first password used for first authentication processing in association with a specific user account, manage a second password used for second authentication processing in association with a specific user account, accept login to the specific user account based on the first authentication processing, permit execution of a password-protected print job associated with the specific user account based on a print instruction without inputting a job password, accept login to the specific user account based on the second authentication processing, and permit execution of a password-protected print job associated with the specific user account based on a print instruction with an input of a job password.

Further features will become apparent from the following description of exemplary embodiments with reference to the attached drawings.

BRIEF DESCRIPTION OF THE DRAWINGS

FIG. 1A is a block diagram illustrating a configuration of a printing system according to a first exemplary embodiment. FIG. 1B is a sequence diagram illustrating a use case 1 of the printing system according to the first exemplary embodiment. FIG. 1C is a sequence diagram illustrating a use case 2 of the printing system according to the first exemplary embodiment.

FIG. 4A is a diagram illustrating a configuration of print data. FIG. 4B is a diagram illustrating a bibliographic information table. FIG. 4C is a diagram illustrating a user management table. FIG. 4D is a diagram illustrating a main body setting table.

FIG. 9A is a flowchart illustrating print data transmission processing. FIG. 9B is a flowchart illustrating print data reception processing.

FIG. 11A is a flowchart illustrating printing processing. FIG. 11B is a flowchart illustrating password necessity determination processing.

FIGS. 12A and 12B are tables each illustrating a relationship between authentication levels and various settings according to the first exemplary embodiment.

FIG. 13A is a block diagram illustrating a configuration of a printing system according to a second exemplary embodiment. FIG. 13B is a sequence diagram illustrating a use case 1 of the printing system according to the second exemplary embodiment. FIG. 13C is a sequence diagram illustrating a use case 2 of the printing system according to the second exemplary embodiment.

FIG. 14A is a diagram illustrating a user management table according to the second exemplary embodiment. FIG. 14B is a table illustrating main body setting items according to the second exemplary embodiment.

FIG. 17 is a diagram illustrating a user management table according to the third exemplary embodiment.

DESCRIPTION OF THE EMBODIMENTS

Figure 2A:
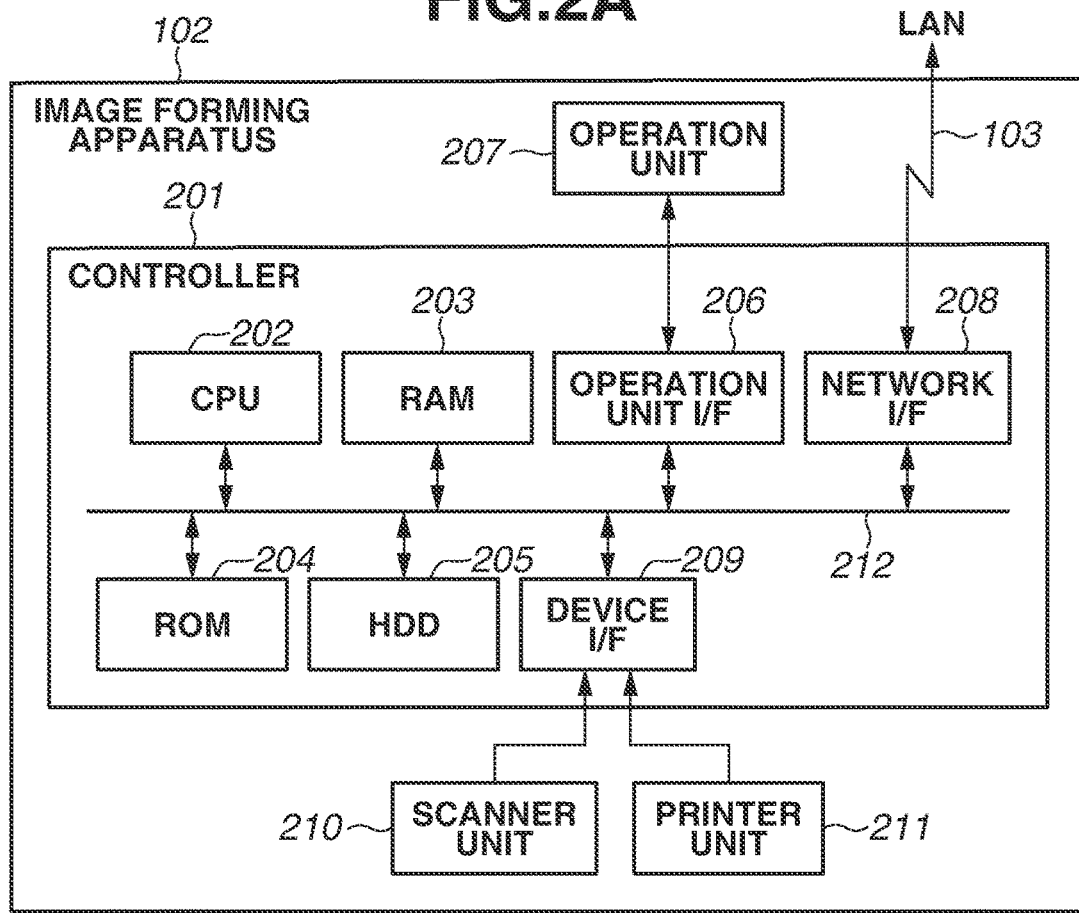
FIG. 2A is a block diagram illustrating a hardware configuration of an image forming apparatus.

Configurations for implementing the present disclosure will be described in detail below based on exemplary embodiments and the accompanying drawings. The scope of the present disclosure is not limited to the configuration described in the exemplary embodiments. Part or all of the configuration can be replaced with equivalents as long as similar effects can be obtained.
<Printing System>
In a first exemplary embodiment, a printing system including an image forming apparatus that performs printing using print data transmitted from an external apparatus will be described. FIG. 1A is a block diagram illustrating a configuration of a printing system according to the first exemplary embodiment. FIG. 1B is a sequence diagram illustrating a use case 1 of the printing system according to the first exemplary embodiment. FIG. 1C is a sequence diagram illustrating a use case 2 of the printing system according to the first exemplary embodiment.

As illustrated in FIG. 1A, a printing system 100 (image thrilling system) includes a personal computer (PC) 101 and an image forming apparatus 102. The PC 101 and the image forming apparatus 102 are communicably connected with each other via a local area network (LAN) 103.

The PC 101 is an information processing apparatus that transmits print data to the image forming apparatus 102. The PC 101 can be replaced by a device (e.g., a mobile terminal or another image forming apparatus) other than a personal computer. The image forming apparatus 102 is an image forming apparatus that forms an image on a sheet based on the print data. In the printing system 100, the image forming apparatus 102 receives the print data, which is generated and transmitted by the PC 101, and performs printing based on the print data. The printing system 100 supports secure printing (password-protected job). More specifically, the PC 101 transmits the print data to which a job password is set, and the image forming apparatus 102, by a user inputting the corresponding job password, can perform printing based on the print data.

The image forming apparatus 102 includes an authentication function and provides a user with various functions based on an authentication level (authentication state). FIGS. 12A and 12B are tables each illustrating relationships between authentication levels and various settings according to the first exemplary embodiment. As illustrated in FIGS. 12A and 12B, the image forming apparatus 102 includes a plurality of authentication methods and setting items for authentication. Examples of the plurality of authentication methods include keyboard authentication and icon authentication as described in detail below. In the present exemplary embodiment, a plurality of authentication levels is allocated based on the authentication method, and the authentication level allocated to the keyboard authentication is higher than the authentication level allocated to the icon authentication. As described above, the image forming apparatus 102 provides the user with functions based on the authentication level. Accordingly, in the printing system 100, as illustrated in FIGS. 1B and 1C, the image thrilling apparatus 102 is used differently according to each use case.

The use case 1 will be described with reference to FIG. 1B. In the use case 1, in step S111, information indicating that a password omission setting for keyboard authentication is ON and a password omission setting for icon authentication is OFF is preliminarily set in the image forming apparatus 102. In step S112, a user A logs into the PC 101 and issues an instruction to enter a password-protected print job. In step S113, the PC 101 generates password-protected print data, and in step S114, the PC 101 transmits the generated password-protected print data to the image forming apparatus 102. In step S115, the image forming apparatus 102 upon receiving the print data, registers the print job. Then, in step S116, the user A performs keyboard login to the image forming apparatus 102 and selects a print function, and then, in step S117, the image forming apparatus 102 displays a job list for the logged in user. In step S118, the user A selects a password-protected print job from the job list and performs a print instruction. In step S119, the image thrilling apparatus 102 omits job password input processing based on the setting in step S111. In step S120, printing based on the print data is started.

The use case 2 will be described with reference to FIG. 1C. In the use case 2, in step S151, information indicating that the password omission setting tier keyboard authentication is ON and the password omission setting for icon authentication is OFF is preliminarily set in the image forming apparatus 102. In step S152, the user A logs into the PC 101 and issues an input instruction to input a password-protected print job. In step S153, the PC 101 generates password-protected print data, and in step S154, the PC 101 transmits the generated password-protected print data to the image forming apparatus 102. In step S155, the image forming apparatus 102 registers, upon receiving the print data, the print job. Then, in step S156, the user A performs icon login to the image forming apparatus 102 and selects the print function. Then, in step S157, the image forming apparatus 102 displays the job list for the logged in user. In step S158, the user A selects the password-protected print job from the job list and issues a print instruction. In step S159, the image funning apparatus 102 requests the user to input a job password according to the setting in step S151. In step S160, the user inputs the job password in response to the request, and in step S161, printing based on the print data is started.

A combination of alphanumeric characters is used as character types for a user password used for keyboard authentication, while a combination of numbers is used as character types for a personal identification number used for icon authentication. A minimum number of characters for a user password used for keyboard authentication is eight (the minimum number of characters that can be set for a user password used for keyboard authentication is eight), while a minimum number of characters for a personal identification number used for icon authentication is four (the minimum number of characters that can be set for a personal identification number used for icon authentication is four). In this way, a personal identification number used for icon authentication is a simple password with a relatively simpler configuration than that of a user password used for keyboard authentication. Thus, the authentication level of icon authentication is lower than the authentication level of keyboard authentication. In view of this situation, according to the present exemplary embodiment, in the keyboard authentication, which is considered to have a higher authentication level, a setting for omitting the input of a job password can be made, while in the icon authentication, which is considered to have a lower authentication level, a setting for preventing the input of a job password from being omitted can be made. Therefore, according to the present exemplary embodiment, it is possible to improve user operability and ensure security. A configuration for implementing the printing system 100 will be described below.

<Configuration of Image Forming Apparatus>

FIG. 2A is a block diagram illustrating a hardware configuration of the image forming apparatus 102. As illustrated in FIG. 2A, the image forming apparatus 102 includes a controller 201, an operation unit 207, a scanner unit 210, and a printer unit 211.

The operation unit 207 is an operation device that displays information for the user to prompt the user to perform an operation, and receives the operation from the user. The operation unit 207 is, for example, an operation panel including a touch screen (display), which displays information and receives a touch operation, and a plurality of hardware keys. Accordingly, the operation unit 207 functions as a display unit (display device) and an input unit (input device).

The scanner unit 210 is an image reading unit (scan device) that reads an image from a document. The scanner unit 210 can scan a document set on a document pressing plate, or can read an image from a document fed from an automatic document feeder (ADF).

The printer unit 211 is an image forming apparatus (image forming unit) that executes image forming processing for forming an image on a sheet based on print data. The printer unit 211 may be a printer unit that employs an electrophotographic method, or may be a printer unit that employs an inkjet method.

The controller 201 is a control unit for controlling each unit of the image forming apparatus 102 in an integrated manner. The controller 201 includes a central processing unit (CPU) 202, a random-access memory (RAM) 203, a read-only memory (ROM) 204, a hard disk drive (HDD) 205, an operation unit interface (I/F) 206, a network I/F 208, and a device I/F 209. In the controller 201, the devices described above are arranged on a system bus 212 and thus can communicate with each other.

The CPU 202 is an arithmetic unit for controlling the entire system. The RAM 203 is a storage unit that stores various data and functions as a system work memory for the CPU 202 to operate. The RAM 203 also functions as an image memory for temporarily storing image data. The RAM 203 also functions as a storage unit that stores an operating system, data, and programs, such as system software and application software. The ROM 204 is a storage unit that stores programs and system boot programs. The HDD 205 is a storage unit that stores a large volume data. The HDD 205 stores an operating system, system software, application software, image data, setting data, and the like. The operation unit I/F 206 is an interface unit for exchanging information between the operation unit 207 and the image forming apparatus 102.

The operation unit I/F 206 outputs, to the operation unit 207, for example, information to be displayed on the operation unit 207. The operation unit I/F 206 acquires, from the operation unit 207, information input by the user's operation. The network I/F 208 is an interface unit for exchanging information between the external apparatus and the image forming apparatus 102. The network I/F 208 is connected to, for example, the LAN 103. The network OF 208 communicates with the external apparatus, such as the PC 101, via the LAN 103.

The device I/F 209 is an interface unit for exchanging information between the scanner unit 210 and the image forming apparatus 102. The device I/F 209 outputs, for example, an instruction to the scanner unit 210, and receives image data input from the scanner unit 210.

The device I/F 209 is an interface unit for exchanging information between the image forming apparatus 102 and the printer unit 211. The device I/F 209 outputs, for example, an instruction, print data, or image data to the printer unit 211, and receives a response content input from the printer unit 211.

Figure 2B:
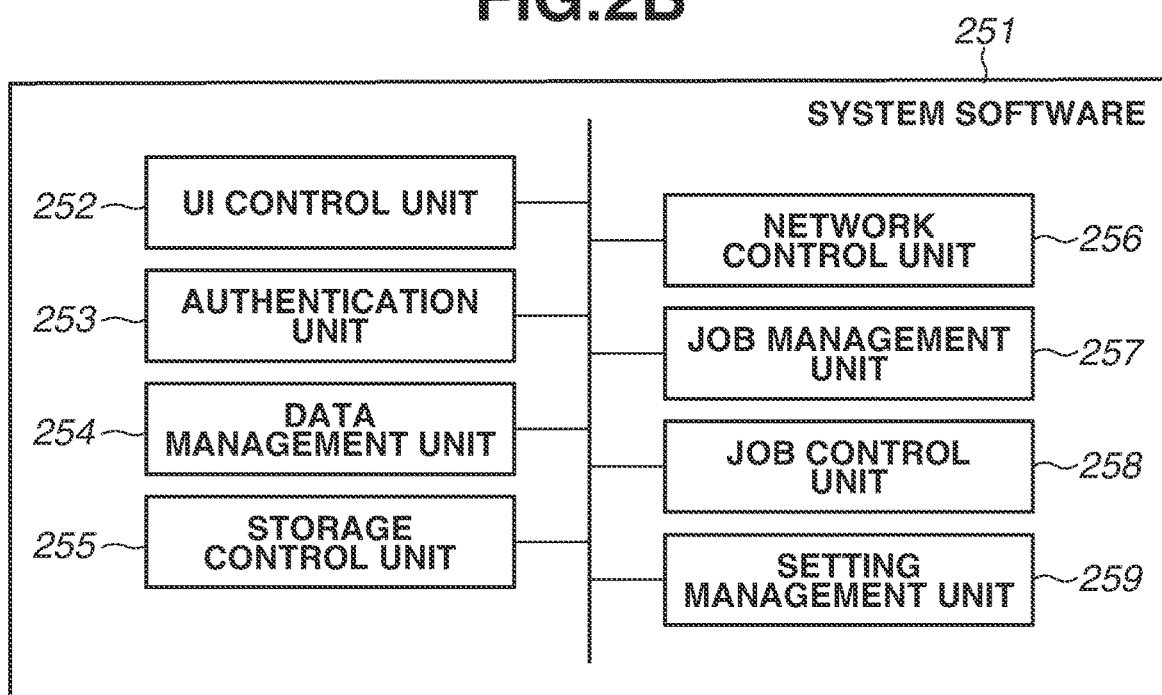
FIG. 2B is a block diagram illustrating a software configuration of the image forming apparatus.

FIG. 2B is a block diagram illustrating a software configuration of the image forming apparatus 102. As illustrated in FIG. 2B, the controller 201 executes various programs by the CPU 202 to thereby implement system software 251. The system software 251 includes functions of a UI control unit 252, an authentication unit 253, a data management unit 254, a storage control unit 255, a network control unit 256, a job management unit 257, a job control unit 258, and a setting management unit 259. In other words, the controller 201 functions as the UI control unit 252, the authentication unit 253, the data management unit 254, the storage control unit 255, the network control unit 256, the job management unit 257, the job control unit 258, and the setting management unit 259.

The UI control unit 252 is a unit for controlling the operation unit 207. The UI control unit 252 receives the information, which is input by the user using the operation unit 207, via the operation unit I/F 206. The UI control unit 252 outputs the information to each of the authentication unit 253, the data management unit 254, and the job management unit 257. The UI control unit 252 also receives a response from each of the authentication unit 253, the data management unit 254, and the job management unit 257. The UI control unit 252 outputs the information to the operation unit 207 via the operation unit I/F 206.

The authentication unit 253 is a unit for authenticating h who operates the image forming apparatus 102. The authentication unit 253 performs authentication processing based on authentication information received from the UI control unit 252, and outputs the result to the storage control unit 255.

The data management unit 254 is a unit for managing input/output of various data including print data. The data management unit 254 receives a data write request and a data read request from each of the UI control unit 252, the network control unit 256, and the job management unit 257. The data management unit 254 outputs a data write request and a data read request to the storage control unit 255. The data management unit 254 receives a response from the storage control unit 255. The data management unit 254 outputs the information to each of the UI control unit 252, the network control unit 256, and the job management unit 257.

The storage control unit 255 is a unit for controlling writing of data to a storage unit and reading of data from the storage unit. The storage control unit 255 receives a data write request and a data read request from the data management unit 254. The storage control unit 255 writes data to the HDD 205, or reads data from the HDD 205 and outputs the result to the data management unit 254.

The network control unit 256 is a unit for controlling communication via a network. The network control unit 256 receives a request from the PC 101 or any image forming apparatus connected to the LAN 103 via the network I/F 208. The network control unit 256 requests the data management unit 254 and the job management unit 257 to perform processing based on the received request. The network control unit 256 receives a response from both the data management unit 254 and the job management unit 257. The network control unit 256 outputs the received response to the PC 101 or any image forming apparatus connected to the LAN 103 via the network I/F 208.

The job management unit 257 is a unit for managing the registration and execution of a print job. The job management unit 257 receives a job execution request from both the UI control unit 252 and the network control unit 256, and manages jobs. The job management unit 257 requests the job control unit 258 to execute jobs. The job management unit 257 transmits a data write request and a data read request to the data management unit 254. The job management unit 257 receives a response from both the data management unit 254 and the job control unit 258. The job management unit 257 transmits a job state to both the UI control unit 252 and the network control unit 256.

The job control unit 258 is a unit for controlling the scanner unit 210 and the printer unit 211 based on a job content. The job control unit 258 receives a job execution request from the job management unit 257. The job control unit 258 controls the operation of both the scanner unit 210 and the printer unit 211 via the device I/F 209. The job control unit 258 receives the operation state of both the scanner unit 210 and the printer unit 211 via the device I/F 209. The job control unit 258 transmits the received content to the job management unit 257.

The setting management unit 259 is a unit for managing setting values for various operations to be performed on a main body.

<Configuration of PC>

Figure 3A:
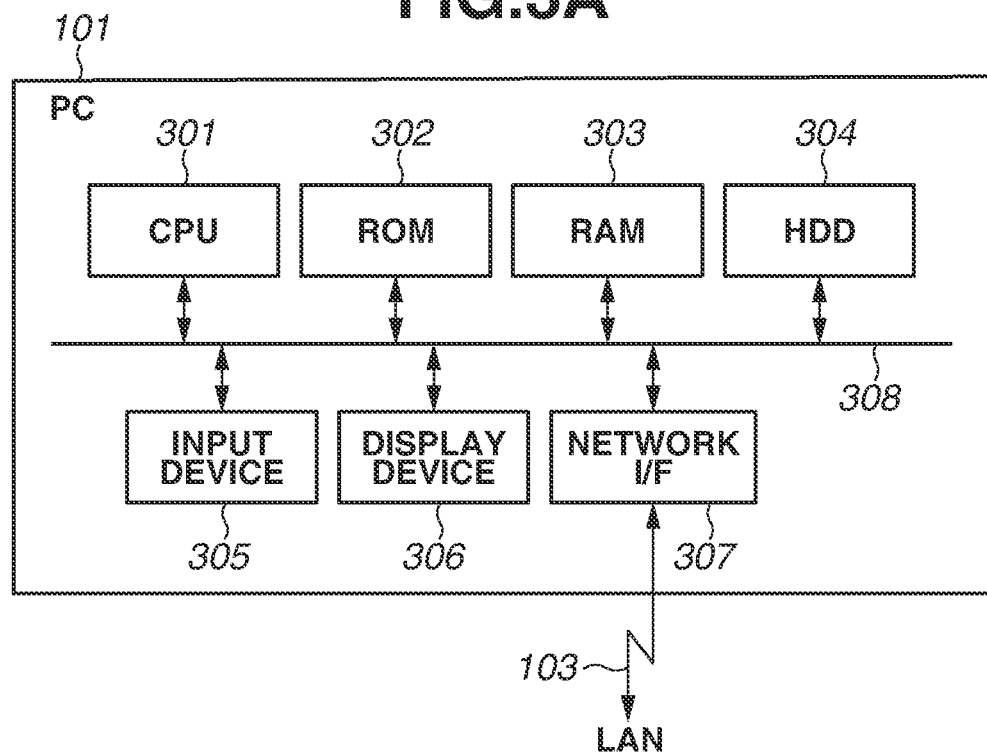
FIG. 3A is a block diagram illustrating a hardware configuration of a personal computer (PC).

FIG. 3A is a block diagram illustrating a hardware configuration of the PC 101.

As illustrated in FIG. 3A, the PC 101 includes a CPU 301, a ROM 302, a RAM 303, an HDD 304, an input device 305, a display device 306, and a network I/F 307. The devices described above are communicably connected with each other via a system bus 308.

The CPU 301 is an arithmetic unit for controlling the entire system of the PC 101. The ROM 302 is a storage unit that stores data. The ROM 302 stores programs and data related to each processing. The RAM 303 is a storage unit that stores data. The RAM 303 functions as a system work memory for the CPU 301 to operate. The RAM 303 also functions as a storage memory for temporarily storing data related to each processing. The HDD 304 is a storage unit that stores a large volume of data. The HDD 304 stores programs and data related to each processing, temporary data, application data, and the like. The input device 305 is an interface for receiving an instruction input by the user. The input device 305 is, for example, a keyboard or a pointing device. The display device 306 is a display unit that displays information. The display device 306 displays, for example, the operation status of the apparatus and information to be output from each program running on the apparatus. The network I/F 307 is a communication unit for communicating with the external apparatus. The network I/F 307 performs input/output of information to/from other PCs or image forming apparatuses connected to the LAN 103.

Figure 3B:
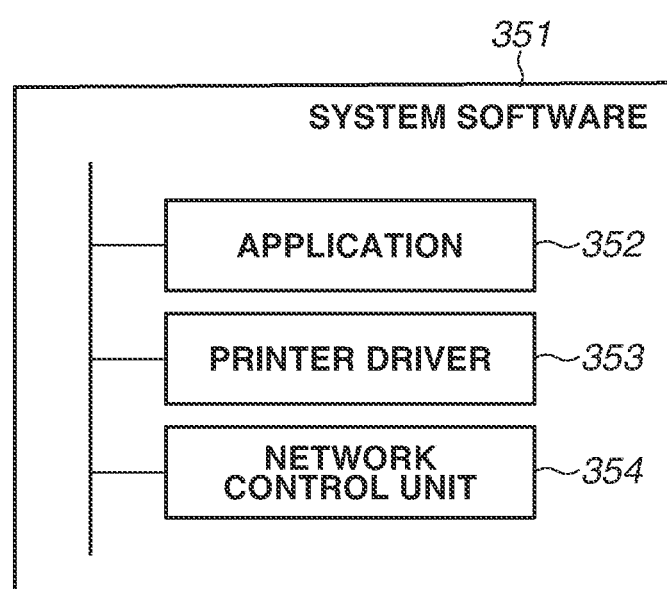
FIG. 3B is a block diagram illustrating a software configuration of the PC.

The CPU 301 executes various programs to implement system software 351. FIG. 3B illustrates the system software 351.

The system software 351 includes an application 352, a printer driver 353, and a network control unit 354. The application 352 is a tool for the user to create and edit an image or a document by using the input device 305, such as a pointing device or a keyboard, while viewing, for example, the display device 306 of the PC 101. The application 352 is also a tool for user to refer to information within the image forming apparatus 102. The user generates data on an image, a document, or the like by using the application 352. The user generates print instruction data by using the printer driver 353. The printer driver 353 transmits the print instruction data to the image forming apparatus 102 via the network control unit 354. The printer driver 353 acquires various setting information or the like from the image forming apparatus 102 via the network control unit 354, and refers to the various setting information or the like.

<Data Configuration>

In the printing system 100, various pieces of data are used and will now be described in detail. FIG. 4A illustrates a configuration of print data. FIG. 4B illustrates a bibliographic information table. FIG. 4C illustrates a user management table. FIG. 4D illustrates a main body setting table.

Print data 410 is data to be transmitted from the PC 101 to the image forming apparatus 102. As illustrated in FIG. 4A, the print data 410 includes a header portion 411 and a page description language (PDL) command portion 412. The header portion 411 includes various information to be added by the printer driver 353. Examples of the information to be added include a user name, a password, a print job name, and a print setting. A password is attached to only the print data to which a password is designated in the printer driver 353. The PDL command portion 412 is a command sequence converted from original document data in the printer driver 353.

A bibliographic information table 420 is a table for registering various information about the acquired print data. The bibliographic information table 420 is stored in, for example, the HDD 205. The bibliographic information table 420 is managed for, for example, each user, based on the user name described in the header portion 411 of the print data 410. The bibliographic information table 420 includes a date/time field 422, an IP address field 423, a storage location field 424, a print job name field 425, a print setting field 426, and a job password field 427. The date/time field 422 stores a date and time when print data is received. The IP address field 423 stores information about a transmission source of print data. The storage location field 424 stores a storage destination path of print data. The print job name field 425 stores a job name acquired from the header portion 411. The print setting field 426 stores print setting information acquired from the header portion 411. The job password field 427 stores the print setting information acquired from the header portion 411. The registration of bibliographic information is performed by, for example, the job management unit 257.

The user management table 430 is a table for managing information used for user authentication, i.e., information about a user account. The user management table 430 is stored in, for example, the HDD 205. The user management table 430 is used for, for example, the authentication unit 253. The user management table 430 includes a user name field 431, a user password field 432, a personal identification number field 433, and a role field 434. The user name field 431 stores a user name of a user registered as a user who can log in. The user password field 432 stores a user password required for keyboard authentication. The user password is input by the user at the time of creating a user account. In other words, the controller 201 receives a new setting of a user password on a user account registration screen (not illustrated). The personal identification number field 433 stores a personal identification number required for icon authentication. The personal identification number is set at the time when the user uses the icon authentication for the first time, or at a user's desired timing. The role field 434 stores a class of each user.

The main body setting table 440 is a table for managing various information for the image forming apparatus 102. The user management table 430 is stored in, for example, the HDD 205. The main body setting table 440 is used for, for example, the setting management unit 259. The main body setting table 440 includes a keyboard authentication field 441, an icon authentication 442, a personal identification number required field 443, a password (PW) omission field (keyboard) 444, and a PW omission field (icon) 445.

The keyboard authentication field 441 stores ON/OFF information indicating whether to use the keyboard authentication. The icon authentication 442 stores ON/OFF information indicating whether to use the icon authentication. The personal identification number required field 443 stores ON/OFF indicating whether to use a personal identification number required setting. The PW omission field (keyboard) 444 stores ON/OFF information indicating whether to use a password input omission function for a password-protected job during the keyboard authentication. The PW omission field (icon) 445 stores ON/OFF information indicating whether to use the password input omission function for the password-protected job during the icon authentication.

The ON/OFF information stored in the main body setting table 440 is used to control the image forming apparatus 102. Accordingly, the image forming apparatus 102 operates in a plurality of operation modes, such as modes 1 to 5, depending on a combination of the ON/OFF information stored in the main body setting table 440.

<Operation Screens>

Various instructions for the image forming apparatus 102 are carried out on operation screens of the operation unit 207. The operation screen will now be described.

<Basic Operation Screens>

Figure 5A:
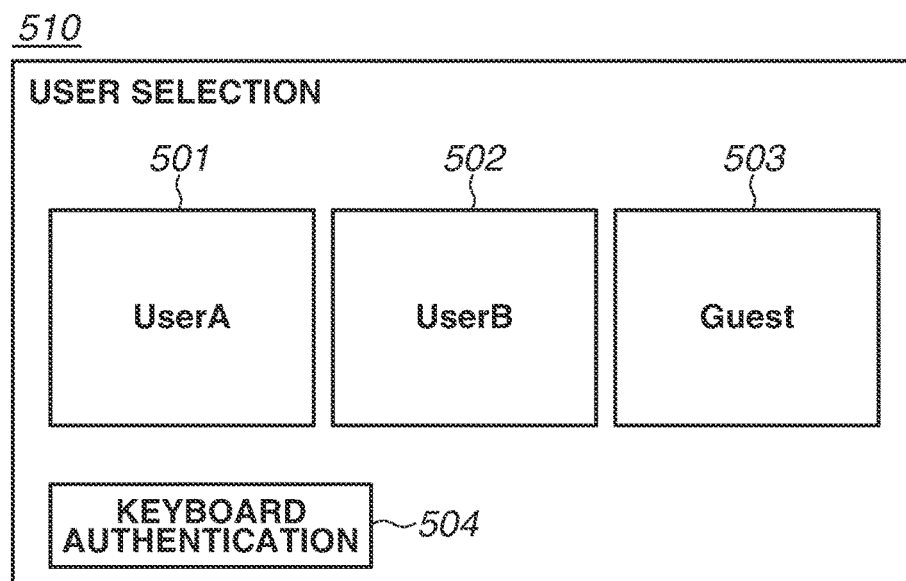
FIG. 5A is a diagram illustrating an authentication screen.
Figure 5B:
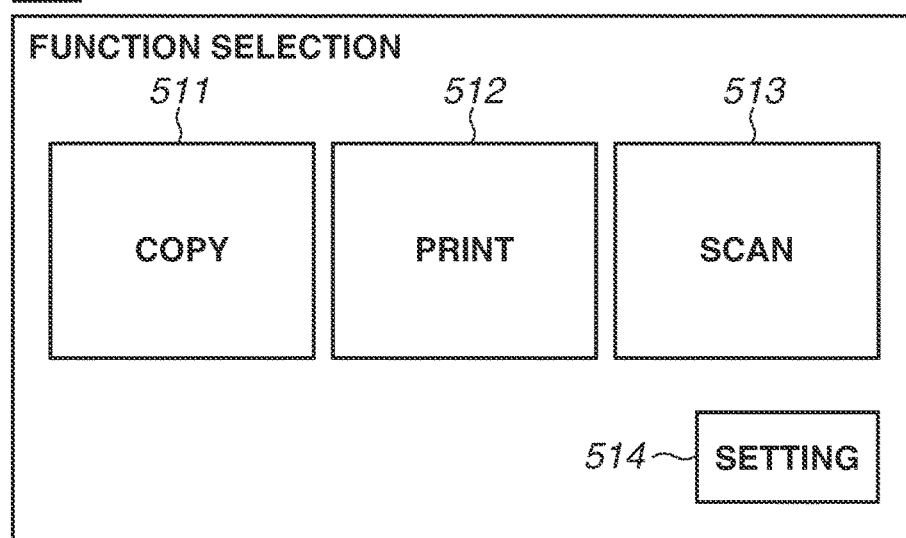
FIG. 5B is a diagram illustrating a function selection screen.
Figure 5C:
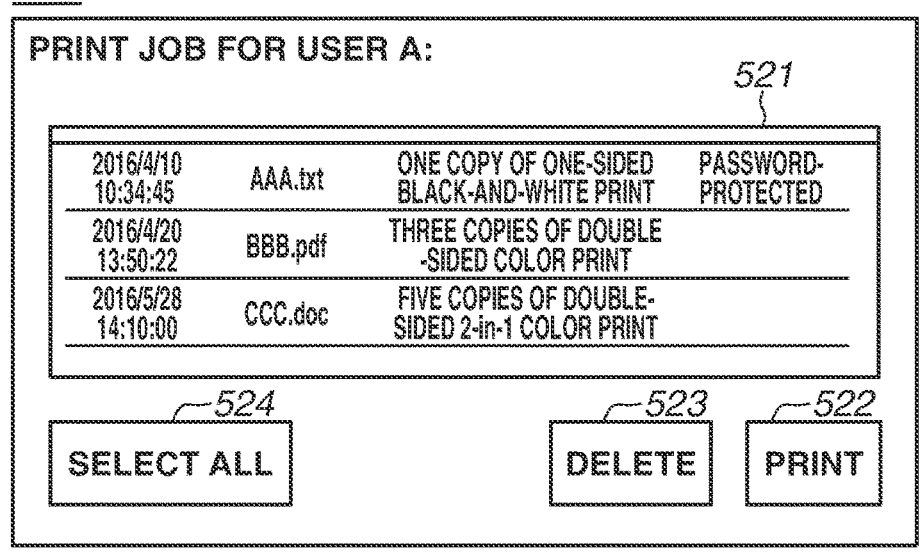
FIG. 5C is a diagram illustrating a job list screen.

FIG. 5A illustrates an authentication screen. FIG. 5B illustrates a function selection screen. FIG. 5C illustrates a job list screen.

A user selection screen 510 illustrated in FIG. 5A is a screen (user specification screen) for specifying the user who is operating the image forming apparatus 102. The user selection screen 510 includes selection objects 501, 502, 503, and 504.

The selection objects 501 and 502 are buttons for performing the icon authentication. The selection object 501 is associated with a user A, and the selection object 502 is associated with a user B. The selection object 503 is a button for implementing a guest utilization function. The selection object 504 is a button (software key) for performing the keyboard authentication.

A function selection screen 520 illustrated in FIG. 5B is a screen for specifying a function to be used by the user. The function selection screen 520 includes selection objects 511, 512, 513, and 514. The selection object 511 is a button for calling a copy function. The selection object 512 is a button for calling a print function. The selection object 513 is a button for calling a scan function. The selection object 514 is a button for calling a setting function.

A job list screen 530 illustrated in FIG. 5C is a screen for selecting print data to be printed and issuing a print instruction. The job list screen 530 includes selection objects 521, 522, 523, and 524. The selection object 521 is a selection list for selecting print data to be printed from among a plurality of print data candidates. The selection object 522 is a button for issuing a printing start instruction for the selected print data. The selection object 523 is a button for deleting the selected print data from the list. The selection object 524 is a button for selecting all print data displayed in the list.

When a user is selected on the user selection screen 510 and the print function is selected on the function selection screen 520, the job list screen 530 is displayed. The user selection screen 510 can be displayed before or after the function selection screen 520 is displayed.

<Setting Screen>

Figure 6A:
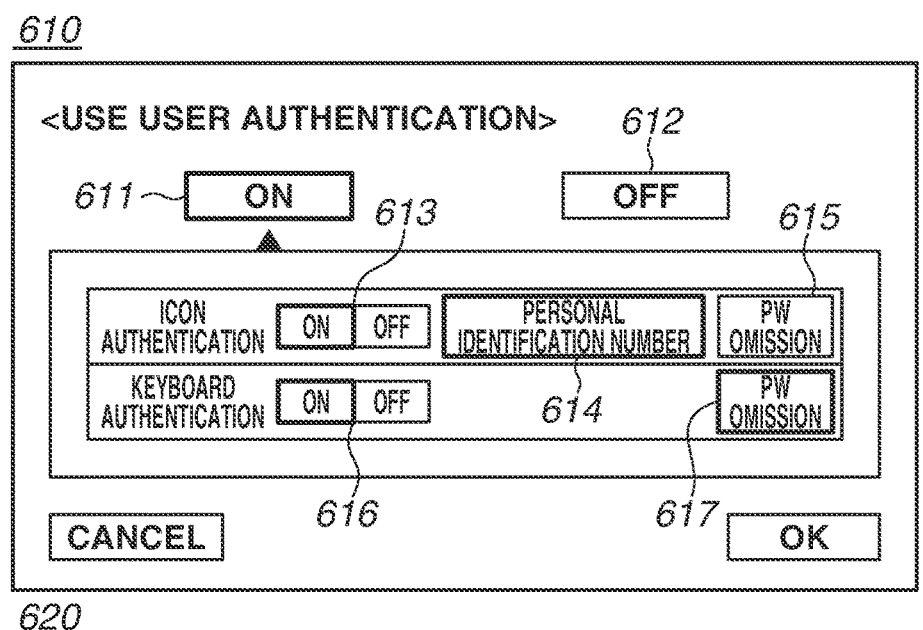
FIG. 6A is a diagram illustrating an authentication setting screen.
Figure 6B:
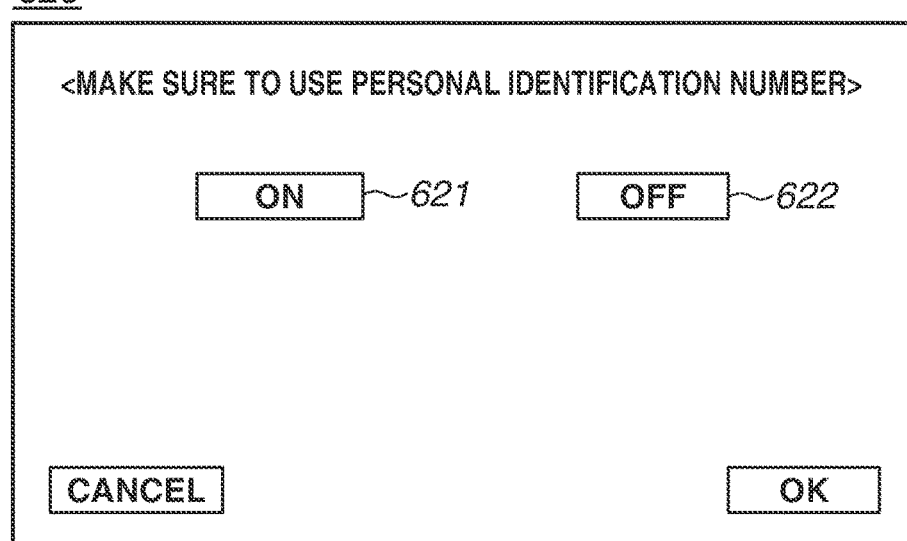
FIG. 6B is a diagram illustrating a setting screen using a personal identification number.
Figure 6C:
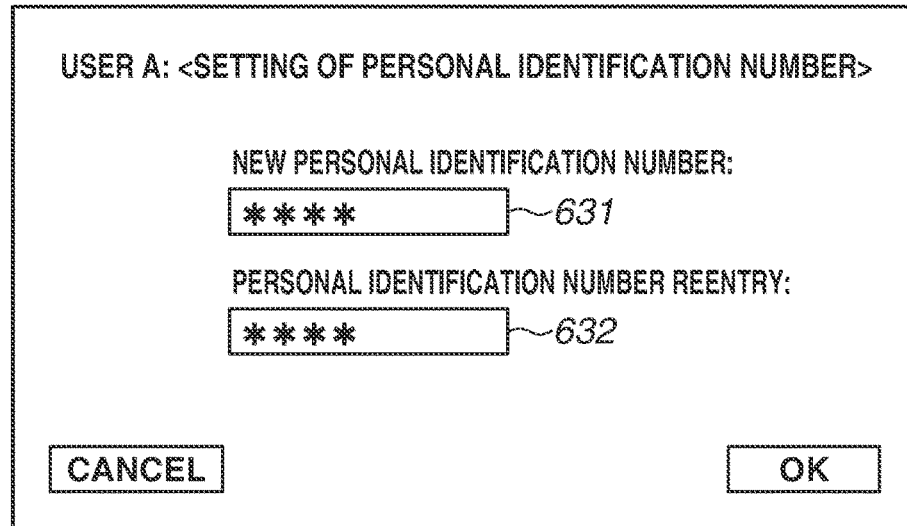
FIG. 6C is a diagram illustrating a personal identification number setting screen.
Figure 7A:
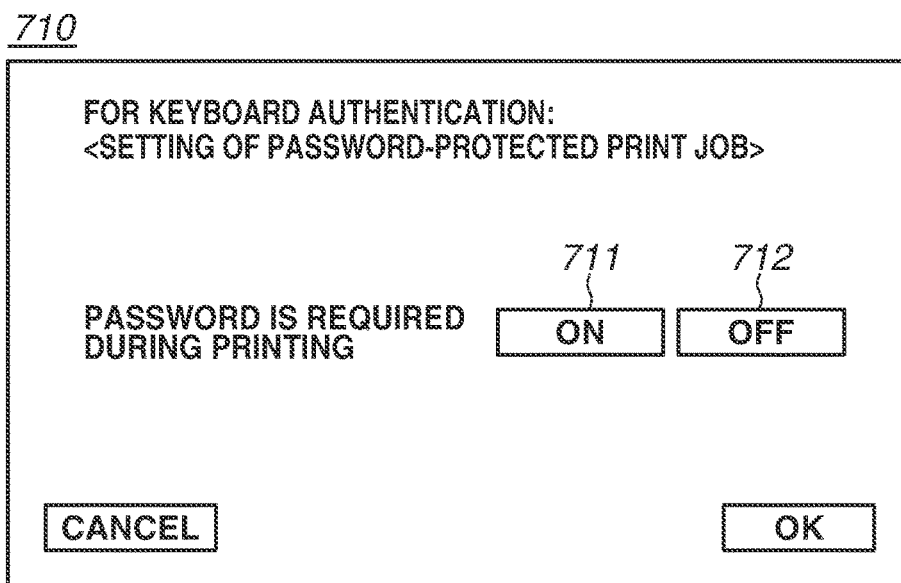
FIG. 7A is a diagram illustrating a password omission screen A.
Figure 7B:
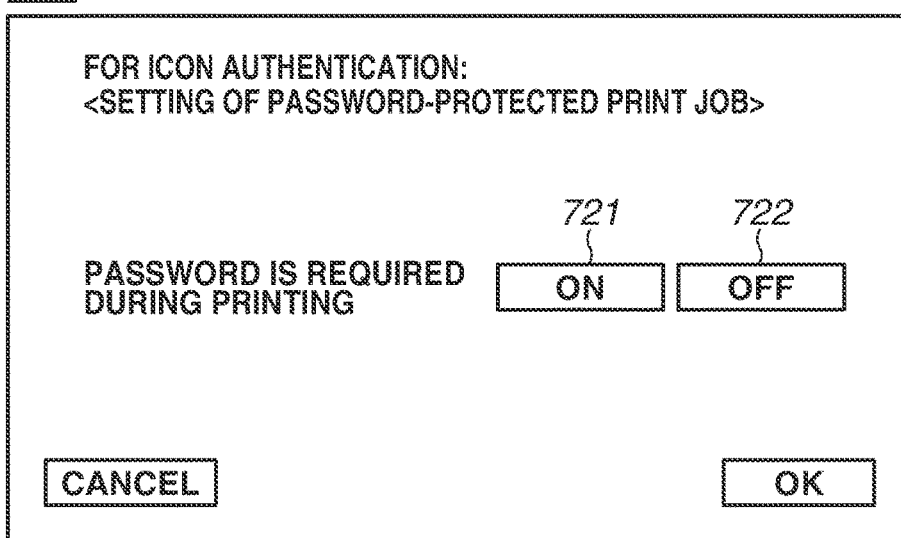
FIG. 7B is a diagram illustrating a password omission screen B.
Figure 7C:
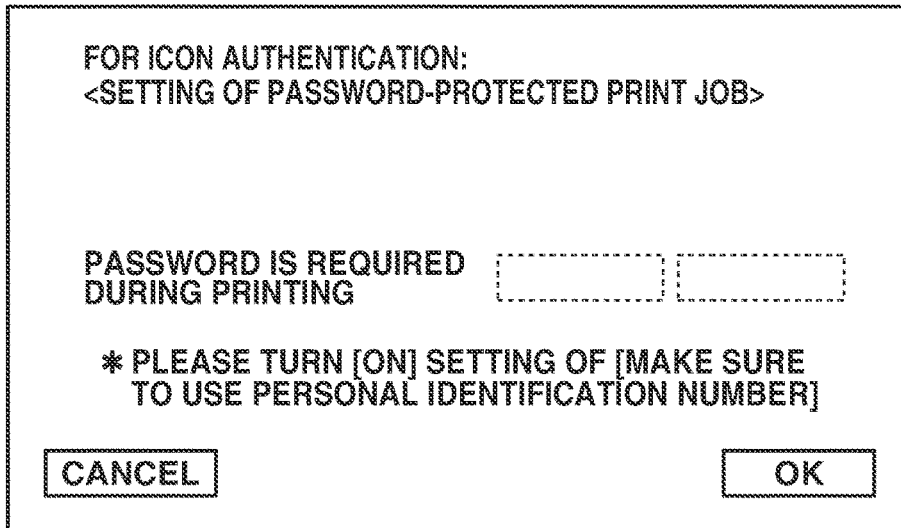
FIG. 7C is a diagram illustrating a password omission screen C.

FIG. 6A illustrates an authentication setting screen. FIG. 6B illustrates a setting screen using a personal identification number. FIG. 6C illustrates a personal identification number setting screen. FIG. 7A illustrates a password omission screen A. FIG. 7B illustrates a password omission screen B. FIG. 7C illustrates a password omission screen C.

An authentication setting screen 610 is a screen that makes various ON/OFF settings for the authentication function.

The authentication setting screen 610 includes selection objects 611, 612, 613, 614, 615, 616, and 617.

The selection object 611 is a button for turning on the authentication function. When the selection object 611 is selected, the detailed authentication setting can be made.

The selection object 612 is a button for turning off the authentication function. When the selection object 612 is selected, all the authentication functions including the icon authentication and the keyboard authentication are turned off.

The selection object 613 is a button for switching ON/OFF the icon authentication function. The selection object 616 is a button for switching ON/OFF the keyboard authentication function.

The selection object 614 is a button for setting a personal identification number to be input in the icon authentication. When the selection object 614 is selected, a setting screen 620 for using a personal identification number is displayed. The setting screen 620 includes selection objects 621 and 622 and enables an ON/OFF setting indicating whether the input of a personal identification number is required in the icon authentication.

When the personal identification number input required setting is ON, a personal identification number setting screen 630 is display when the user first logs in. When any password is input to input forms 631 and 632 and an OK button is pressed, the personal identification number is registered in the user account.

When the selection object 617 is selected on the authentication setting screen 610, a password omission setting screen 710 illustrated in FIG. 7A is displayed. The password omission setting screen 710 includes selection objects 711 and 712 and enables an ON/OFF setting indicating whether to omit the input of a password for a password-protected print job associated with the user in the keyboard authentication.

In a state where the icon authentication setting is ON and the personal identification number utilization setting is ON, when the selection object 615 is selected on the authentication setting screen 610, a password omission setting screen 720 illustrated in FIG. 7B is displayed. The password omission setting screen 720 includes selection objects 721 and 722 and enables an ON/OFF setting indicating whether to omit the input of a password for a password-protected print job associated with the user in the icon authentication.

In a state where the icon authentication setting or the personal identification number utilization setting is OFF, when the selection object 615 is selected on the authentication setting screen 610, a password omission setting screen 730 illustrated in. FIG. 7C is displayed. On the password omission setting screen 730, selection objects for setting are masked to prevent a setting as to whether to omit the input of a password from being made.

<Screen Transition>

Figure 8:
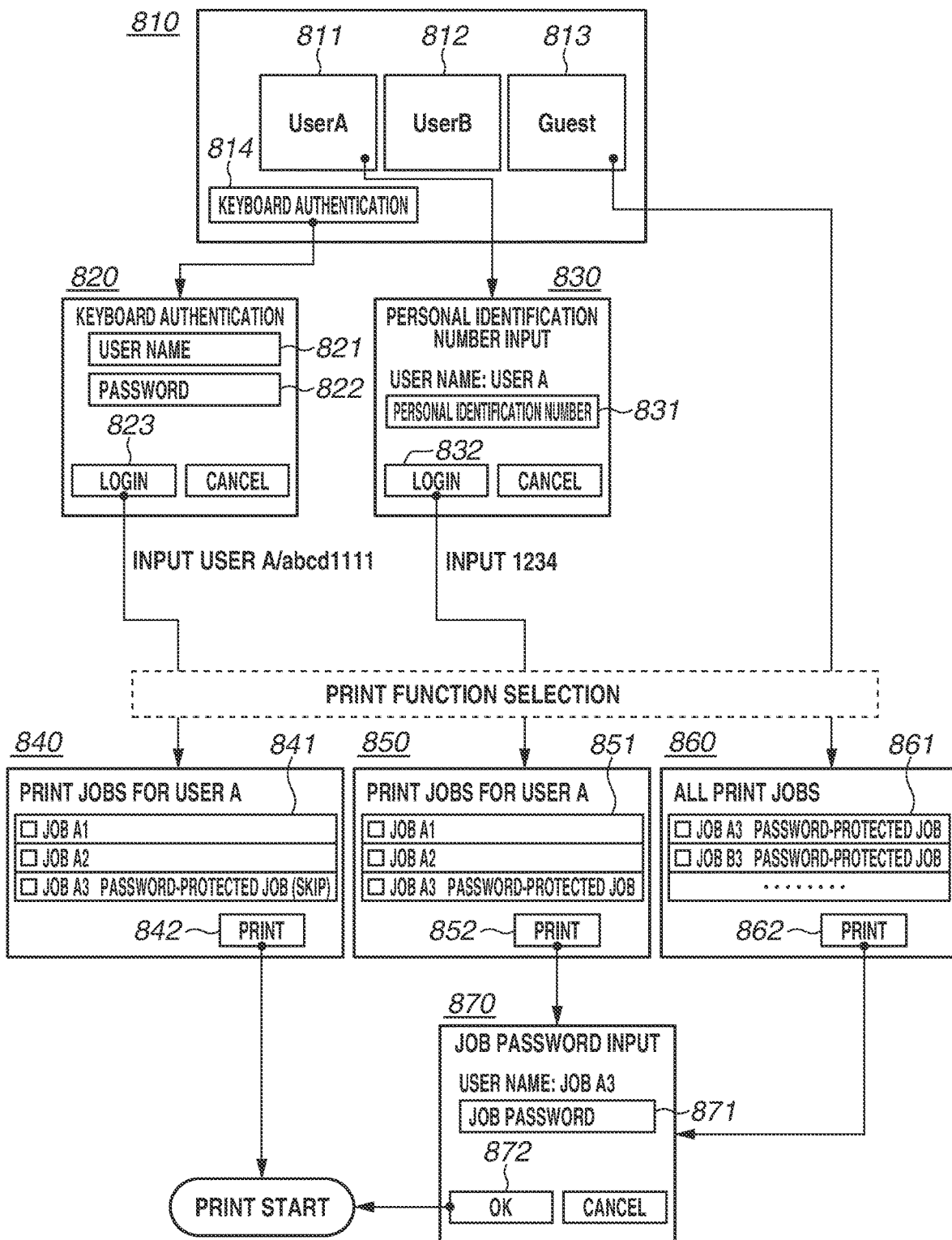
FIG. 8 is a diagram illustrating a screen transition.

FIG. 8 illustrates a screen transition. A screen transition to the execution of a password-protected print job in a state where the main body setting is set in the mode 2 illustrated in FIG. 4D will be described below for each of the keyboard authentication and the icon authentication.

First, a case where printing for a job A3 is performed as a password-protected print job for the user A by using the keyboard authentication will be described.

When the user starts the operation of the image forming apparatus 102, a screen 810 is displayed on the display of the operation unit 207. When a selection object 814 is selected on the screen 810, a screen 820 is displayed. The keyboard authentication is carried out on the screen 820. When a user name (user A) and a user password (abcd1111) are input to input forms 821 and 822, respectively, on the screen 820 and a selection object 823 is selected, a login state to the account of the user A is obtained. Then, when the print function is selected on the function selection screen, a screen 840 is displayed. A list of print jobs associated with the user A is displayed on the screen 840. When a job password-protected print job (job A3) is selected from a job list 841 and a selection object 842 is selected, printing or the job A3 is started without requesting the input of a job password (without inputting a job password).

Next, a case where printing for the job A3 is performed as a password-protected print job for the user A by using the icon authentication will be described.

When the user starts the operation of the image forming apparatus 102, the screen. 810 is displayed on the display of the operation unit 207. When a selection object 811 is selected on the screen 810, a screen 830 is displayed. A personal identification number for icon authentication is input on the screen 830. When a personal identification number (1234) is input to an input form 831 on the screen 830 and a selection object 832 is selected, a login state to the account of the user A is obtained. Alter that, when the print function is selected on the function selection screen, a screen 850 is displayed. A list of print jobs associated with the user A is displayed on the screen 850. When the job password-protected print job (job A3) is selected from a job list 851 and a selection object 852 is selected, a screen 870 is displayed to request the input of a job password. When the job password is input to an input form 871 and a selection object 872 is selected, printing for the job A3 is started.

Lastly, a case where printing for the job A3 is performed as a password-protected print job for the user A by using the guest utilization function will be described.

When the user starts the operation of the image forming apparatus 102, the screen 810 is displayed on the display of the operation unit 207. When a selection object 813 is selected on the screen 810, the user can use the function as a guest user. Then, when the print function is selected on the function selection screen, a screen 860 is displayed. All print jobs registered in the image forming apparatus 102 are displayed on the screen 860. A setting for displaying a print job to which a job password is set can be made. When the job password-protected print job (job A3) is selected from a job list 861 and a selection object 862 is selected, the screen 870 is displayed to request the input of a job password. When the job password is input to the input form 871 and the selection object 872 is selected, printing for the job A3 is started.

<Flowchart>

FIG. 9A is a flowchart illustrating print data transmission processing. The processing illustrated in the flowchart of FIG. 9A is executed by the CPU 301 of the PC 101.

When the application 352 for generating document data on an image, a document, or the like issues an instruction to call the print function, in step S901, the CPU 301 starts the reception of a print function operation instruction. First, in step S902, the CPU 301 causes the display device 306 to display a list of printer drivers and receives the designation of a print data input destination. Then, if a detailed setting is instructed (YES in step S903), the processing proceeds to step S904. In step S904, the CPU 301 causes the display device 306 to display the setting screen. If a detailed setting is not instructed (NO in step S903), the processing proceeds to step S907.

If password attachment is designated on a detailed setting screen (YES in step S905), the processing proceeds to step S906. In step S906, the CPU 301 receives the input of the job password. If password attachment is not designated (NO in step S905), the processing proceeds to step S907. After the processing for print setting is completed, in step S907, the CPU 301 waits for an input start instruction. If the input start is not instructed (NO in step S907), the CPU 301 terminates the processing. If the input start is instructed (YES in step S907), the processing proceeds to step S908. In step S908, the CPU 301 generates print data by generating PDL, data according to document data generated by the application 352, data on an image or a document, a document attribute such as a document name, a print setting, a user name, and a password. In step S609, the CPU 301 transmits a print job to the image forming apparatus 102.

FIG. 9B is a flowchart illustrating print data reception processing. The processing illustrated in the flowchart of FIG. 9B is executed by the controller 201, more specifically, the CPU 202, of the image forming apparatus 102.

In step S911, the network control unit 256 receives the print data from the PC 101 and delivers a processing instruction to the job management unit 257. Upon receiving the processing instruction, in step S912, the job management unit 257 determines whether a job password is attached to the received print data. If the print data is job password-protected print data (YES in step S912), the processing proceeds to step S915.

If the print data is not job password-protected print data (NO in step S912), the processing proceeds to step S913. In step S913, the job management unit 257 determines whether a print job hold setting is made as the setting for the image forming apparatus 102. The print job hold setting is stored by the storage control unit 255 in, for example, the HDD 205 or the RAM 203. If the print job hold setting is not made (NO in step S913), the processing proceeds to step S918. In step S918, the job management unit 257 requests the job control unit 258 to execute the print job based on the print data and causes the printer unit 211 to execute printing (permits execution of printing). If the print job hold setting is made (YES in step S913), the processing proceeds to step S914. In step S914, the job management unit 257 analyzes the print data and determines whether the print job based on the print data is a hold printing target job. The hold printing target print job described herein refers to a print job in which information attached to the original print data, such as a job name, a user name, and identification information of a transmission source PC matches a predetermined condition.

If the print job is not a hold printing target job (NO in step S914), the processing proceeds to step S918. In step S918, the job management unit 257 requests the job control unit 258 to execute the print job and causes the printer unit 211 to execute printing. If the print job is a hold printing target job (YES in step S914), the job management unit 257 transmits the print job to the data management unit 254, and the processing proceeds to step S915. In step S915, the data management unit 254 analyzes the print data received from the job management unit 257, and extracts bibliographic information.

The data management unit 254 transmits the print data and the extracted bibliographic information to the storage control unit 255. In step S916, the storage control unit 255 stores the received print data in the HDD 205, and in step S917, the storage control unit 255 stores the extracted bibliographic information in the HDD 205 in association with the user.

In the processing of steps S915, S916, and S917, if the processing is unsuccessful, for example, due to an insufficient free space of the HDD 205, the processing is terminated. If the processing up to the registration of the bibliographic information is successful, the print job based on the print data can be registered as a hold printing job and printing can be performed at a timing when a print instruction is received from the user. As described above, a series of processing related to the print job hold setting is carried out.

Figure 10:
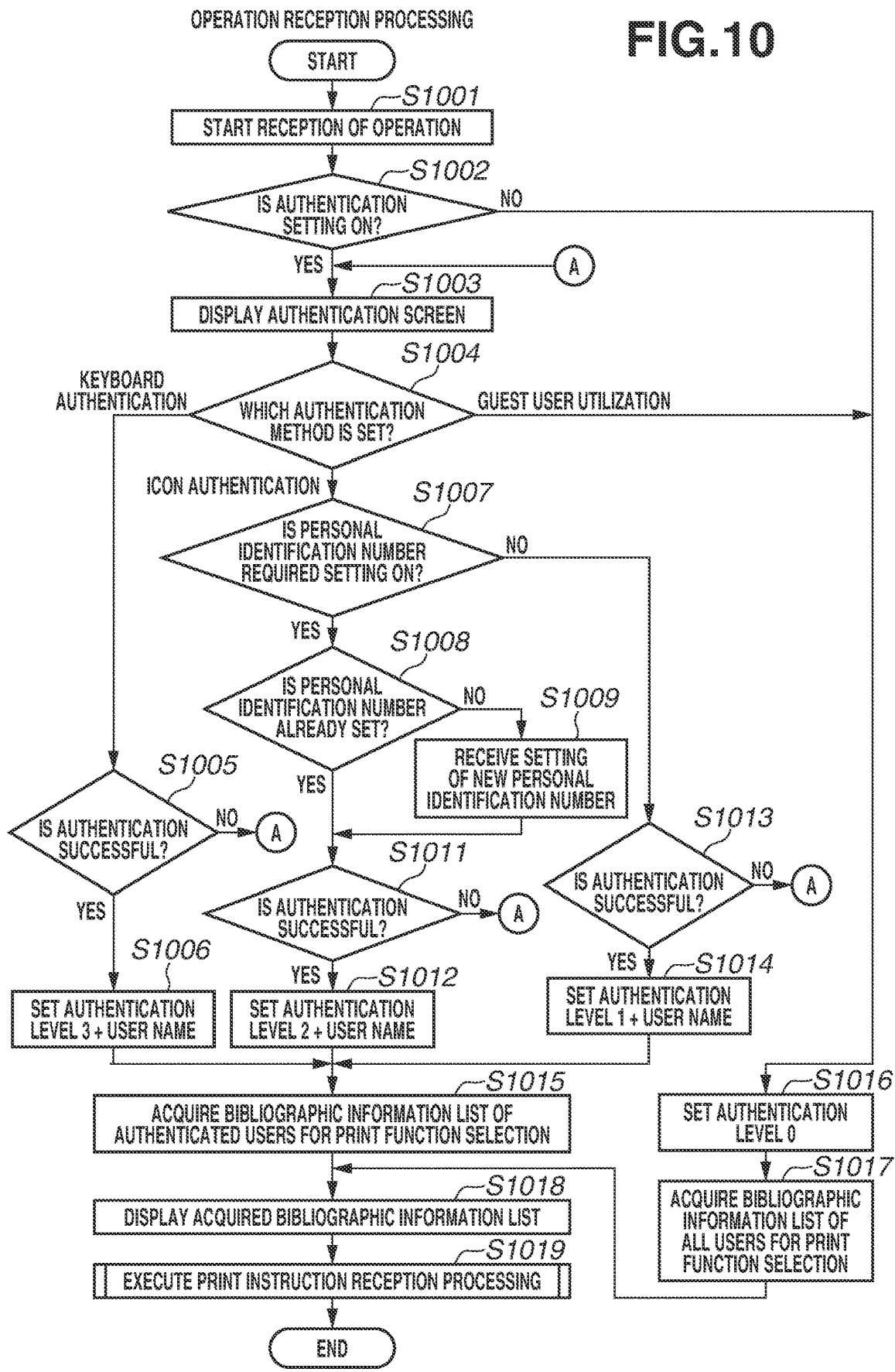
FIG. 10 is a flowchart illustrating operation reception processing.

FIG. 10 is a flowchart illustrating operation reception processing. The processing illustrated in the flowchart of FIG. 10 is executed by the controller 201, more specifically, the CPU 202, of the image forming apparatus 102.

In step S1001, when the user starts an operation on the operation unit 207, the controller 201 starts the reception of the operation. When the operation starts, the controller 201 that functions as the setting management unit 259 checks ON/OFF of the authentication setting. If the authentication setting is ON (YES in step S1002), the processing proceeds to step S1003. In step S1003, the controller 201 causes the operation unit 207 to display the user selection screen 510 for authentication. If the authentication setting is OFF (NO in step S1002), the processing proceeds to step S1016. Then, the controller 201 receives an instruction to select an authentication method by the user.

If the keyboard authentication is set as the authentication method (keyboard authentication in step S1004), the controller 201 causes the operation unit 207 to display a keyboard authentication screen and receives the input of authentication information for keyboard authentication. More specifically, when the button 504 is selected on the user selection screen 510, the controller 201 causes the operation unit 207 to display a keyboard authentication screen and receives the input of authentication information for keyboard authentication. If the authentication is successful (YES in step S1005), the processing proceeds to step S1006. In step S1006, the controller 201 causes the RAM 203 to store flag information indicating a user name and an authentication level 3 and is brought into a login state. If the authentication is unsuccessful (NO in step S1005), the processing returns to step S1003.

If the icon authentication is set as the authentication method (icon authentication in step S1004), in other words, if the selection objects 501 and 502 are selected on the user selection screen 510, the processing proceeds to step S1007. In step S1007, the controller 201 first checks ON/OFF of the personal identification number required setting. If the personal identification number required setting is ON (YES in step S1007), the processing proceeds to step S1008. If the personal identification number required setting is OFF (NO in step S1007), the processing proceeds to step S1013. In step S1008, the controller 201 checks whether the personal identification number is already set in the selected user account. If the personal identification number is already set (YES in step S1008), the processing proceeds to step S1011. If the personal identification number is not already set (NO in step S1008), the processing proceeds to step S1009. In step S1009, the controller 201 receives the setting for a new personal identification number, and then the processing proceeds to step S1011. In step S1011, the controller 201 receives the input of the personal identification number on a personal identification number input screen, checks whether the input personal identification number matches the personal identification number set in the selected user account, and thus determines the authentication. If the authentication is successful (YES in step S1011), the processing proceeds to step S1012. In step S1012, the controller 201 causes the RAM 203 to store flag information indicating a user name and an authentication level 2 and is brought into the login state. If the authentication is unsuccessful (NO in step S1011), the processing returns to step S1003.

Similarly, in step S1013, if the authentication is successful (YES in step S1013), the processing proceeds to step S1014. In step S1014, the controller 201 causes the RAM 203 to store flag information indicating a user name and an authentication level 1 and is brought into the login state. If the authentication is unsuccessful (NO in step S1013), the processing returns to step S1003.

After the login state is obtained through steps S1006, S1012, and S1014, when the execution of the print function is designated, that is, when the button 512 is selected on the function selection screen 520, the controller 201 acquires bibliographic information about the print job associated with the authenticated user.

If a guest user utilization method is set as the authentication method (guest user utilization in step S1004), the processing proceeds to step S1016. In step S1016, the controller 201 causes the RAM 203 to store flag information indicating an authentication level 0. When the execution of the print function is designated, that is, when the button 512 is selected on the function selection screen 520, the controller 201 acquires bibliographic information about all print jobs.

In steps S1015 or S1017, if the bibliographic information is acquired, in step S1018, the controller 201 causes the operation unit 207 to display a list of acquired bibliographic information (e.g., the job list screen 530). Then, in step S1019, the controller 201 executes the print instruction reception processing.

FIG. 11A is a flowchart illustrating print instruction reception processing. The processing illustrated in the flowchart of FIG. 11A is detailed processing of step S1019 illustrated in FIG. 10. The processing illustrated in the flowchart of FIG. 11A is executed by the controller 201, more specifically, the CPU 202, of the image forming apparatus 102.

In step S1101, the controller 201 receives an instruction to select a print job and start printing on the job list screen 530. In this case, in step S1102, the job management unit 257 analyzes the bibliographic information for the selected print job, and performs job password input necessity result acquisition processing. Details of the job password input necessity result acquisition processing will be described below. In step S1103, the controller 201 determines whether a job password is required based on the acquired result. If the job password is not required (NO in step S1103), the processing proceeds to step S1107. If the job password is required (YES in step S1103), the processing proceeds to step S1104. In step S1104, the controller 201 causes the operation unit 207 to display a screen for requesting the input of the job password. In step S1105, the controller 201 receives the input of the job password. Next, in step S1106, the controller 201 determines whether the input password matches the job password associated with the print data. If the input password does not match the job password (NO in step S1106), the processing returns to step S1104. If the input password matches the job password (YES in step S1106), the data management unit 254 transmits a request for acquiring the print job. Then, the processing proceeds to step S1107. In step S1107, the controller 201 acquires the target print data from the storage destination. The data management unit 254 acquires the designated print job from the HDD 205 via the storage control unit 255. The data management unit 254 transmits the print job to the job control unit 258 via the job management unit 257. The job control unit 258 outputs the received print job to the printer unit 211. In this way, in step S1.108, the controller 201 causes the printer unit 211 to execute image formation based on the acquired print data. As described above, a series of processing relating to the print instruction reception processing is carried out.

FIG. 11B is a flowchart illustrating password necessity determination processing. The processing illustrated in the flowchart of FIG. 11B is detailed processing of step S1102 illustrated in FIG. 11A. The processing illustrated in the flowchart of FIG. 11B is executed by the controller 201, more specifically, the CPU 202, of the image forming apparatus 102.

When a print instruction target job is designated, in step S1111, the job management unit 257 acquires and analyzes print instruction target bibliographic information. In step S1112, the controller 201 determines whether the print job is a password-protected print job based on the analysis result.

If the print job is not a job password-protected print job (NO in step S1112), the processing proceeds to step S1109.

If the print job is a job password-protected print job (YES in step S1112), the processing proceeds to step S1113. In step S1113, the controller 201 determines whether the current state indicates that the user authentication is finished. More specifically, the controller 201 determines whether a value other than "0" is set as an authentication level flag. If the user authentication is not finished (NO in step S1113), that is, if "0" is set as the authentication level flag, the processing proceeds to step S1118. If the user authentication is finished (YES in step S1113), that is, if a value other than "0" is set as the authentication level flag, the processing proceeds to step S1114.

In step S1114, the controller 201 determines whether the print job for which printing is designated is a job for an authenticated user. If the print job is not a job for the authenticated user (NO in step S1114), the processing proceeds to step S1118. If the print job is a job for the authenticated user (YES in step S1114), the processing proceeds to step S1115.

In step S1115, the controller 201 checks the authentication level f the authenticated user. If the flag indicating the authentication level 1 is set (authentication level 1 in step S1115), the processing proceeds to step S1118. In other words, if the icon authentication is set as the authentication method and the setting of "make sure to use a personal identification number" is OFF, the processing proceeds to step S1118.

If the flag indicating the authentication level 2 is set (authentication level 2 in step S1115), the processing proceeds to step S1116. In other words, if the icon authentication is set as the authentication method and the setting of "make sure to use a personal identification number" is ON, the processing proceeds to step S1116.

In step S1116, the controller 201 determines ON/OFF of the job password omission setting for icon authentication. If the job password omission setting for icon authentication is OFF (NO in step S1116), the processing proceeds to step S1118. If the job password omission setting for icon authentication is ON (YES in step S1116), the processing proceeds to step S1119.

If the flag indicating the authentication level 3 is set (authentication level 3 in step S1115), the processing proceeds to step S1117. In other words, if the keyboard authentication is set as the authentication method and the setting of "make sure to use a personal identification number" is ON, the processing proceeds to step S1117.

In step S1117, the controller 201 determines ON/OFF of the job password omission setting for keyboard authentication. If the job password omission setting for keyboard authentication is OFF (NO in step S1117), the processing proceeds to step S1118. If the job password omission setting for keyboard authentication is ON (YES in step S1117), the processing proceeds to step S1119.

In step S1118, the controller 201 causes the RAM 203 to store a flag indicating that a job password is required (omission of a job password is not allowed), and then terminates the processing.

In step S1119, the controller 201 stores a flag indicating that a job password is not required (omission of a job password is allowed) in the RAM 203, and then terminates the processing.

The flags stored in steps S1118 or S1119 are used for determination in step S1103.

<Advantageous Effects>

According to the first exemplary embodiment, the setting as to whether to omit a job password can be changed depending on the authentication method. Accordingly, it ensuring the security and improving user operability can be achieved.

According to the first exemplary embodiment, a job password omission setting for each authentication method can be made. Thus, the setting can be customized depending on the use environment of the user, and therefore excellent usability can be obtained.

In the first exemplary embodiment, if the setting of "make sure to use a personal identification number" is ON in the case of icon selection login, the authentication level is determined to be "2". In a second exemplary embodiment, it is determined whether to set the authentication level to "2" or "1" based on whether the personal identification number is set for the log-in user, regardless of the setting of "make sure to use a personal identification number". FIG. 12B is a table illustrating a relationship between authentication levels and various settings according to the second exemplary embodiment. As illustrated in FIG. 12B, in the second exemplary embodiment, even when the setting of "make sure to use a personal identification number" is OFF, if a personal identification number is set for the log-in user, the authentication level is set to "2". Therefore, when the password input omission setting for icon authentication is ON, the input of a job password for the user whose personal identification number is set can be omitted in printing for the user's print job. The input of a job password tier the user whose personal identification number is not set cannot be omitted in printing for the user's print job.

In this manner, detailed settings can be made, thereby improving the user operability and ensuring the security. A printing system 1300 according to the second exemplary embodiment is similar to the printing system 100 according to the first exemplary embodiment, except for the configuration relating to the difference described above. Accordingly, similar components are denoted by the same reference numerals, and detailed descriptions thereof are omitted.

When the setting of "make sure to use a personal identification number" is OFF, the user selects the setting button 514 on the function selection screen 520 to call the setting screen. Then, the user sets any personal identification number on the personal identification number setting screen 630.

FIG. 13A illustrates the configuration of the printing system according to the second exemplary embodiment. FIG. 13B illustrates a use case 1 of the printing system according to the second exemplary embodiment. FIG. 13C illustrates a use case 2 of the printing system according to the second exemplary embodiment.

As illustrated in FIG. 13A, the printing system 1300 includes a PC-A 1301, a PC-B 1302, and the image forming apparatus 102, which are communicably connected with each other via the LAN 103.

The PC-A 1301 is a terminal used by the user A. The PC-B 1302 is a terminal used by the user B. The user A is a user whose personal identification number is already set, and the user B is a user whose personal identification number is not set. The functions and configurations of the PC-A 1301 and the PC-B 1302 are similar to those of the PC 101, and thus descriptions thereof are omitted. In the printing system 1300, a case where the user A performs printing using icon authentication is described as the use case 1, and a case where the user B performs printing using icon authentication is described as the use case 2.

First, referring to FIG. 13B, the use case 1 will be described in FIG. 13B, steps S1311, S1312, S1313, S1314, S1315, S1317, S1318, S1319, and S1320 respectively correspond to steps S112, S113, S114, S115, S117, S118, S119, and S120. Step S1311 differs from step S111 in that the preliminarily set information indicates that "the personal identification number for the user A is already set and the personal identification number for the user B is not set". Step S1316 differs from step S116 in that the processing performed in step 13116 is "icon login and print function selection processing". As illustrated in FIG. 13B, since the personal identification number for the user A is already set, the input of a job password can be omitted.

Next, the use case 2 will be described with reference to FIG. 13C. In FIG. 13C, steps S1352, S1353, S1354, S1355, S1357, S1358, S1359, S1360, and S1361 respectively correspond to steps S152, S153, S154, S155, S157, S158, S159, S160, and S161. Step S1351 differs from step S151 in that the preliminarily set information indicates that "the personal identification nu nber for the user A is already set and the personal identification number for the user B is not set". Step S1356 differs from step S156 in that the processing performed in step S1356 is "icon login and print function selection processing". As illustrated in FIG. 13B, the personal identification number for the user B in icon authentication is not set, and thus the input of a job password is required.

FIG. 14A is a table illustrating a user management table according to the second exemplary embodiment. FIG. 14B is a table illustrating main body setting items according to the second exemplary embodiment.

In the second exemplary embodiment, since the personal identification number for the user B is not set, the user management table is as illustrated in FIG. 14A. The second exemplary embodiment is based on the premise that the setting of "make sure to use a personal identification number" is OFF, and thus modes 6, 7, 8, and 9 illustrated in FIG. 14B are set as related setting modes.

Figure 15:
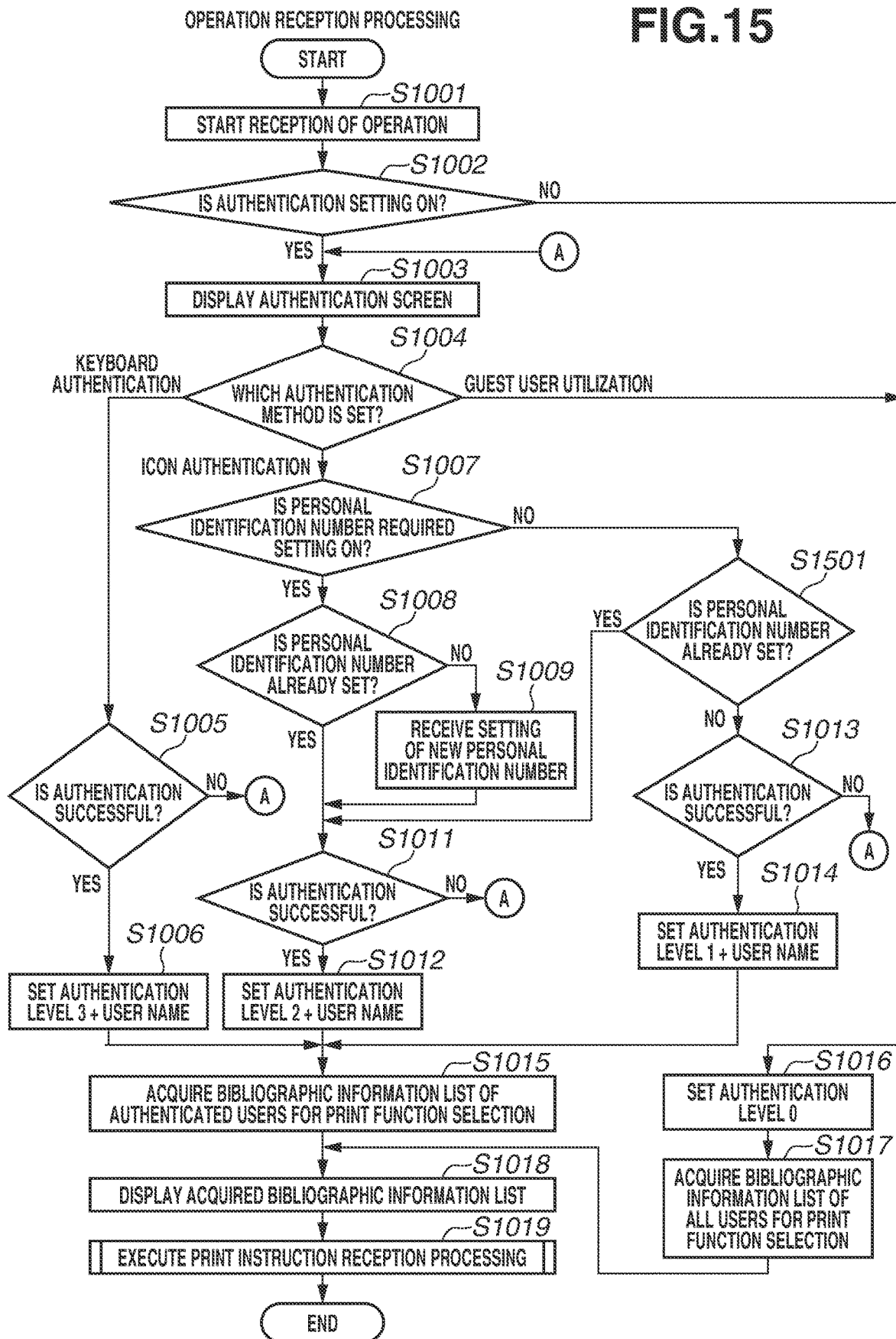
FIG. 15 is a flowchart illustrating operation reception processing according to the second exemplary embodiment.

FIG. 15 is a flowchart illustrating operation reception processing according to the second exemplary embodiment. In the second exemplary embodiment, even when the setting of "make sure to use a personal identification number" is OFF, if a personal identification number is set for the log-in user, the authentication level is set to "2". Accordingly, step S1501 is added as a determination flow for the operation reception processing. Therefore, if the personal identification number is already set, the processing proceeds to step S1011. If the personal identification number is not set, the processing proceeds to step S1013.

<Advantageous Effects>

According to the second exemplary embodiment, additional detailed settings to those in the first exemplary, and thus excellent usability can be obtained.

In the first and second exemplary embodiments, one setting value is set for all users for the job password omission setting. In a third exemplary embodiment, the job password omission setting can be made for each user. Accordingly, the input of a job password can be omitted in printing for a print job associated with the user whose job password input omission setting is turned on, while the input of a job password cannot be omitted in printing for a print job associated with the user whose job password input omission setting is turned off. In this manner, detailed settings can be made, thereby improving the user operability and ensuring the security. A printing system 1600 according to the third exemplary embodiment is similar to the printing system 1300 according to the second exemplary embodiment, except for the configuration relating to the difference described above. Therefore, similar components are denoted by the same reference numerals, and detailed descriptions thereof are omitted.

Figure 16A:
FIG. 16A is a block diagram illustrating a configuration of a printing system according to a third exemplary embodiment.

As illustrated in FIG. 16A, the printing system 1600 includes the PC-A 1301, the PC-B 1302, and the image forming apparatus 102, which are communicably connected with each other via the LAN 103.

The PC-A 1301 is a terminal used by the user A. The PC-B 1302 is a terminal used by the user B. The user A is a user whose password omission setting is turned on, and the user B is a user whose password omission setting is turned off. The functions and configurations of the PC-A 1301 and the PC-B 1302 are similar to those of the PC 101, and thus descriptions thereof are omitted. In the printing system 1300, a case where the user A performs printing using icon authentication is described as the use case 1, and a case where the user B performs printing using icon authentication is described as the use case 2.

Figure 16B:
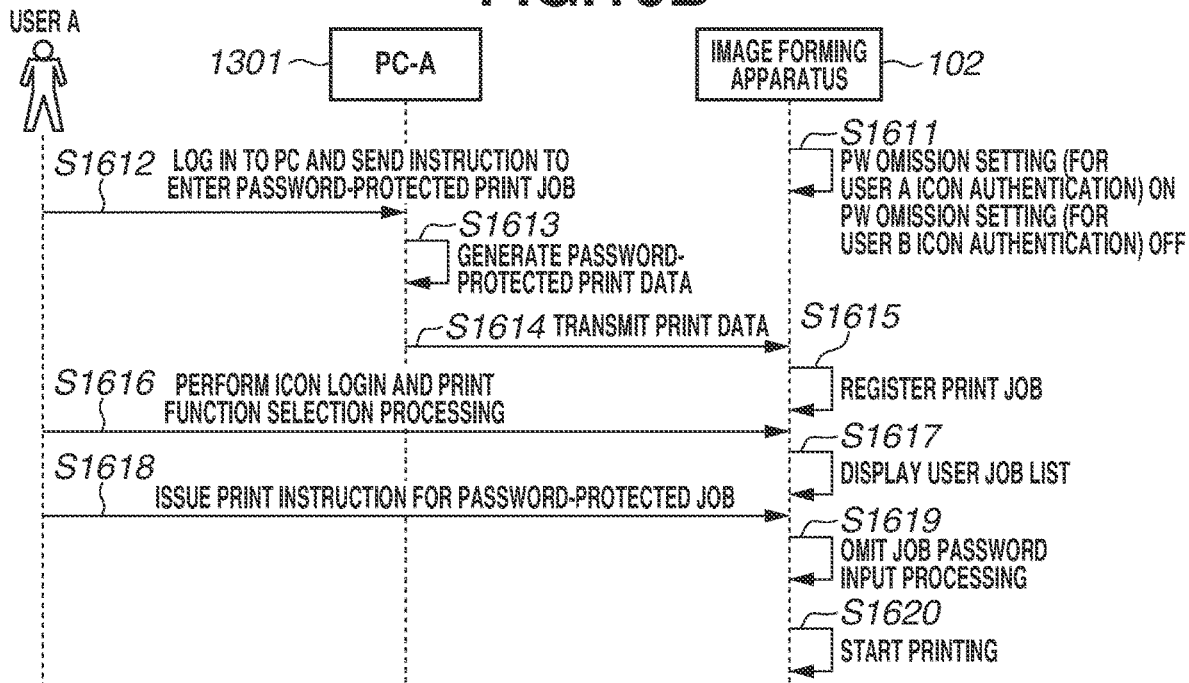
FIG. 16B is a sequence diagram illustrating a use case 1 of the printing system according to the third exemplary embodiment.

First, the use case 1 will be described with reference to FIG. 16B. In FIG. 16B, steps S1611, S1612, S1613, S1614, S1615, S1616, S1617, S1618, S1619, and S1620 respectively correspond to steps S1311, S1312, S1313, S1314, S1315, S1316, S1317, S1318, S1319, and S1320. Step S1611 differs from step S1311 in that the preliminarily set information indicates that "a PW omission setting (for icon authentication for the user A) is ON and a PW omission setting (for icon authentication for the user B) is OFF". As illustrated in FIG. 16B, since the job password omission setting for the user A is ON, the input of a job password can be omitted.

Figure 16C:
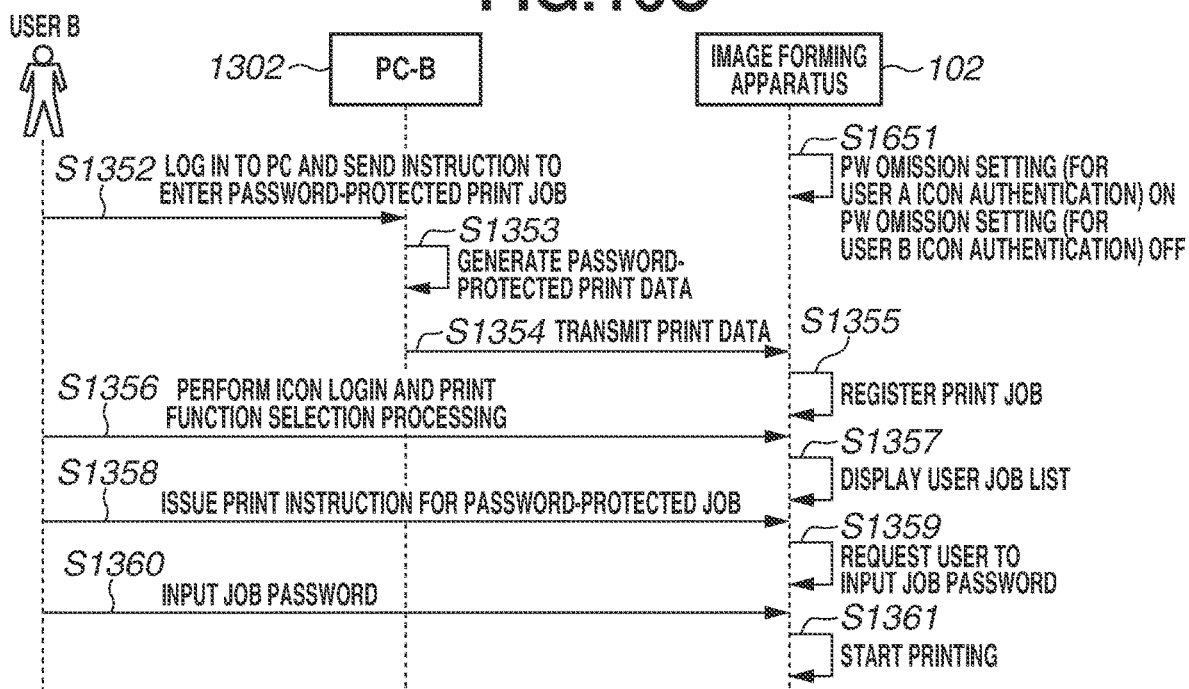
FIG. 16C is a sequence diagram illustrating a use case 2 of the printing system according to the third exemplary embodiment.

Next, the use case 2 will be described with reference to FIG. 1.6C. In FIG. 16C, steps S1352, S1353, S1354, S1355, S1357, S1358, S1359, S1360, and S1361 respectively correspond to processing of S152, S153, S154, S155, S157, S158, S159, S160, and S161. Step S1651 differs from step S1351 in that the preliminarily set information indicates that "the PW omission setting (for icon authentication for the user A) is ON and the PW omission setting (for icon authentication for the user B) is OFF". As illustrated in FIG. 16C, since the job password omission setting for the user B is OFF, the input of a job password is required.

FIG. 17 is a diagram illustrating a user management table according to the third exemplary embodiment.

In the third exemplary embodiment, the PW omission setting is made for each user, and thus setting values for the PW omission setting are managed in the user management table.

As illustrated in FIG. 17, a user management table 1730 includes the user name field 431, the user password field 432, the personal identification number field 433, the role field 434, a PW omission (keyboard) field 1735, a PW omission (icon) field 1736. The user name field 431, the user password field 432, the personal identification number field 433, and the role field 434 are similar to those in the user management table 430 according to the first exemplary embodiment. The user management table 1730 differs from the user management table 430 according to the first exemplary embodiment in that the PW omission (keyboard) field 1735 and the PW omission (icon) field 1736 are added.

<Advantageous Effects>

According to the third exemplary embodiment, the PW omission setting can be managed for each user, and thus excellent usability can be obtained.

As described above, according to the exemplary embodiments described above, an image forming apparatus is provided that makes a job password omission setting depending on a plurality of authentication levels.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-196455, filed Oct. 6, 2017, which is hereby incorporated by reference herein in its entirety.

What is claimed is:

1. An image forming apparatus comprising:
a display device;
one or more memories in which a setting is stored, the setting indicating whether an input of a password for user authentication is required; and
a processor which is executing instructions which are stored in the one or more memories and cause the image forming apparatus to:
receive a print job from an external apparatus;
store the received print job in association with a user in the one or more memories;
authenticate a user based on at least specification of user information; and
perform the stored print job based on a print instruction being received on the display device from the authenticated user,
wherein, in a case where the setting indicates that an input of a password for user authentication is required, a print job with a job password which is stored in the one or more memories and associated with the authenticated user is performed based on a print instruction without inputting the job password, and
wherein, in a case where the setting indicates that an input of a password for user authentication is not required, a print job with a job password which is stored in the one or more memories and associated with the authenticated user is performed based on an input of the job password and a print instruction.

2. The image forming apparatus according to claim 1, wherein, even in a case where the setting indicates that an input of a password for user authentication is not required, if the password is set for the user, a print job with a job password which is stored in the one or more memories and associated with the authenticated user is performed based on a print instruction without inputting a job password.

3. The image forming apparatus according to claim 1, wherein the setting is performed as one setting for all users of the image forming apparatus.

4. The image forming apparatus according to claim 1, wherein the setting is performed individually for each user of the image forming apparatus.

5. The image forming apparatus according to claim 1, wherein, in a case where the specification of user information is performed based on an input of a user name on the display device.

6. The image forming apparatus according to claim 1, wherein the specification of user information is performed based on a user object being selected on the display device.

7. The image forming apparatus according to claim 1, wherein a job password input is required in a case where the authenticated user gives a print instruction for a print job with a job password, the print job being associated with another user who is not identical to the authenticated user.

8. A control method for an image forming apparatus, the control method comprising:
receiving a print job from an external apparatus;
storing the received print job in association with a user in one or more memories of the image forming apparatus;
authenticating a user based on at least specification of user information; and performing the stored print job based on a print instruction being received on a display device of the image forming apparatus from the authenticated user, wherein, in a case where a user has been authenticated based on specification of user information and an input of a password, a print job with a job password which is stored in the one or more memories and associated with the authenticated user is performed based on a print instruction without inputting the job password, and wherein, in a case where a user has been authenticated based on specification of user information without inputting of a password, a print job with a job password which is stored in the one or more memories and associated with the authenticated user is performed based on an input of the job password and a print instruction.

9. A non-transitory computer readable storage medium on which is stored a computer program for making a computer execute a control method for an image forming apparatus, the control method comprising:

receiving a print job from an external apparatus;

storing the received print job in association with a user in one or more memories of the image forming apparatus;

authenticating a user based on at least specification of user information; and performing the stored print job based on a print instruction being received on a display device of the image forming apparatus from the authenticated user, wherein, in a case where a user has been authenticated based on specification of user information and an input of a password, a print job with a job password which is stored in the one or more memories and associated with the authenticated user is performed based on a print instruction without inputting the job password, and wherein, in a case where a user has been authenticated based on specification of user information without inputting of a password, a print job with a job password which is stored in the one or more memories and associated with the authenticated user is performed based on an input of the job password and a print instruction.

10. An image forming apparatus comprising:

a display device;

one or more memories; and a processor which is executing instructions which are stored in the one or more memories and cause the image forming apparatus to:

receive a print job from an external apparatus;

store the received print job in association with a user in the one or more memories;

authenticate a user based on at least specification of user information; and perform the stored print job based on a print instruction being received on the display device from the authenticated user, wherein, in a case where a user has been authenticated based on specification of user information and an input of a password, a print job with a job password which is stored in the one or more memories and associated with the authenticated user is performed based on a print instruction without inputting the job password, and wherein, in a case where a user has been authenticated based on specification of user information without inputting of a password, a print job with a job password which is stored in the one or more memories and associated with the authenticated user is performed based on an input of the job password and a print instruction.

* * * * *